US011197069B2

United States Patent
Liu et al.

(10) Patent No.: US 11,197,069 B2
(45) Date of Patent: Dec. 7, 2021

(54) DISPLAY METHOD FOR LIVE BROADCAST SCREEN OF LIVE BROADCAST ROOM, STORAGE DEVICE AND COMPUTER DEVICE

(71) Applicant: Guangzhou Huya Information Technology Co., Ltd., Guangdong (CN)

(72) Inventors: Jing Liu, Guangdong (CN); Zhenjie Zhong, Guangdong (CN); Xinjie Wang, Guangdong (CN); Wei Quan, Guangdong (CN); Hao Dong, Guangdong (CN)

(73) Assignee: Guangzhou Huya Information Technology Co., Ltd.

( * ) Notice: Subject to any disclaimer, the term of this patent is extended or adjusted under 35 U.S.C. 154(b) by 0 days.

(21) Appl. No.: 16/770,843

(22) PCT Filed: Aug. 8, 2018

(86) PCT No.: PCT/CN2018/099459
§ 371 (c)(1),
(2) Date: Sep. 29, 2020

(87) PCT Pub. No.: WO2019/114298
PCT Pub. Date: Jun. 20, 2019

(65) Prior Publication Data
US 2021/0127171 A1 Apr. 29, 2021

(30) Foreign Application Priority Data
Dec. 13, 2017 (CN) .......................... 201711328563.3
Dec. 13, 2017 (CN) .......................... 201711330274.7

(51) Int. Cl.
*H04N 21/485* (2011.01)
*G06F 3/0488* (2013.01)
(Continued)

(52) U.S. Cl.
CPC ......... *H04N 21/485* (2013.01); *G06F 3/0488* (2013.01); *H04N 21/4312* (2013.01); *H04N 21/4331* (2013.01)

(58) Field of Classification Search
CPC ............ H04N 21/485; H04N 21/4312; H04N 21/4331; H04N 21/234363;
(Continued)

(56) References Cited

U.S. PATENT DOCUMENTS 6,564,378 B1 * 5/2003 Satterfield .............. H04N 21/47
725/40
8,719,857 B1 5/2014 Ellis et al.
(Continued)

FOREIGN PATENT DOCUMENTS

CN 105472428 A 4/2016
CN 106028143 A 10/2016
(Continued)

OTHER PUBLICATIONS

International Search Report for Application No. PCT/CN2018/099459 dated Oct. 29, 2018, 2 pages.

*Primary Examiner* — Fernando Alcon
(74) *Attorney, Agent, or Firm* — Lerner, David, Littenberg, Krumholz & Mentlik, LLP

(57) ABSTRACT

The present application provides a display method for live broadcast screen of live broadcast room, storage device and computer device. The method includes the steps of: displaying multiple live broadcast cards on a current interface; identifying a user's touch action, and determining an address and playback mode of an audio and video stream of a touched live broadcast card according to the touch action; when it is determined that the playback mode is a small window mode, acquiring an audio and video stream of a live broadcast screen of a live broadcast room corresponding to the live broadcast card according to the address of the audio
(Continued)

and video stream and parsing the audio and video stream; and drawing a small window interface on the current interface, and using the small window interface to play the parsed audio and video stream of the live broadcast screen.

5 Claims, 16 Drawing Sheets

(51) Int. Cl.
*H04N 21/431* (2011.01)
*H04N 21/433* (2011.01)
(58) Field of Classification Search
CPC .......... H04N 21/4314; H04N 21/4821; H04N 21/2187; G06F 3/0488
See application file for complete search history.

(56) References Cited

U.S. PATENT DOCUMENTS

| | | | |
|---|---|---|---|
| 9,635,091 B1* | 4/2017 | Laukkanen | G06F 3/04845 |
| 9,942,615 B1* | 4/2018 | Panchaksharaiah | G06F 16/738 |
| 10,271,079 B1* | 4/2019 | Woschank | H04N 21/4788 |
| 2002/0174430 A1* | 11/2002 | Ellis | G11B 27/034 |
| | | | 725/46 |
| 2009/0307731 A1* | 12/2009 | Beyabani | H04N 21/44204 |
| | | | 725/87 |
| 2012/0290952 A1* | 11/2012 | Paluch | H04N 21/4383 |
| | | | 715/758 |
| 2013/0254308 A1* | 9/2013 | Rose | H04N 21/252 |
| | | | 709/206 |
| 2014/0282790 A1* | 9/2014 | Stephens | H04N 21/4532 |
| | | | 725/116 |
| 2015/0304697 A1* | 10/2015 | Trombetta | A63F 13/00 |
| | | | 725/116 |
| 2016/0080817 A1* | 3/2016 | Chai | G06F 3/0482 |
| | | | 725/43 |
| 2016/0259413 A1* | 9/2016 | Anzures | G06F 3/0416 |
| 2017/0344192 A1 | 11/2017 | Liu et al. | |
| 2018/0199102 A1* | 7/2018 | Gross | H04N 21/2187 |
| 2018/0246329 A1* | 8/2018 | Bamberger | G06T 3/40 |
| 2019/0111343 A1* | 4/2019 | Payzer | A63F 13/52 |
| 2021/0162302 A1* | 6/2021 | Perlman | H04N 21/6377 |

FOREIGN PATENT DOCUMENTS

| | | |
|---|---|---|
| CN | 106534879 A | 3/2017 |
| CN | 106993214 A | 7/2017 |
| CN | 108024135 A | 5/2018 |
| CN | 108093290 A | 5/2018 |

* cited by examiner

Click icon to reduce and enter a small window mode, return to a top level table list page
Gesture: Video area moves towards right
Interaction: 1. Reduce from the left top to the right bottom, and reduce gradually Click icon to reduce and play in a small window, and enter a able list page
Gesture: No
Interaction: 1. Reduce from the left top to the right bottom, and reduce gradually

DISPLAY METHOD FOR LIVE BROADCAST SCREEN OF LIVE BROADCAST ROOM, STORAGE DEVICE AND COMPUTER DEVICE

CROSS-REFERENCE TO RELATED APPLICATIONS

The present application is a national phase entry under 35 U.S.C § 371 of International Application No. PCT/CN2018/099459 filed Aug. 8, 2018, which claims priority from Chinese Application Nos. 201711330274.7 and 201711328563.3 filed Dec. 13, 2017, all of which are hereby incorporated herein by reference.

FIELD OF THE INVENTION

This application relates to the field of software applications, and specifically relates to a display method for live broadcast screen of live broadcast room, storage device and computer device.

BACKGROUND OF THE INVENTION

Generally, a live broadcast application displays various types of live broadcast lists to users, and different types of live broadcast cards are displayed in the live broadcast list, which correspond to different live broadcast contents. The user enters a corresponding live broadcast room by clicking the live broadcast card to watch a corresponding live broadcast content, and the user can also interact with the streamer in the corresponding live broadcast room. However, the user may need to continuously click on the live broadcast card to enter the corresponding live broadcast room to watch the live broadcast content to find the live broadcast content of interest, and thus it may greatly reduce the efficiency of the user in finding the content he or she is interested in. In addition, the user enters the live broadcast list, browses the streamer card in the live broadcast list, initially determines the user is interested according to the content of the live broadcast card and the static screen displayed on the live broadcast card, and clicks to enter the corresponding live broadcast room. After the user enters the corresponding live broadcast room to view the content of the same, he finds that he is not interested in the content of the live broadcast room and needs to return to the original live broadcast list to find a new live broadcast room. Such repeated operations to return to the live broadcast list and switch the live broadcast room to find the live broadcast content of the live broadcast room of interest greatly reduces the efficiency of the user switching the live broadcast room.

SUMMARY OF THE INVENTION

The first purpose of this application is to provide a display method for live broadcast screen of live broadcast room, storage device and computer device, which allows the user to quickly preview the content of a live broadcast screen corresponding to a live broadcast room, so as to improve the user's efficiency in finding interesting live broadcast content.

The second purpose of this application is to provide a display method for live broadcast screen of live broadcast room, storage device and computer device, which allows the user to quickly switch preview live broadcast content corresponding to the live broadcast room without entering the live broadcast room, reducing the number of times the user repeatedly switches the live broadcast room, thereby improving the efficiency of the user switching the live broadcast room.

In order to achieve the above purposes, this application proposes the following technical solutions:

In a first aspect, the present application provides a display method for live broadcast screen of live broadcast room on a mobile device, including the following steps:

displaying multiple live broadcast cards on a current interface; identifying a user's touch action, and determining an address and playback mode of an audio and video stream of a touched live broadcast card according to the touch action; when it is determined that the playback mode is a small window mode, acquiring an audio and video stream of a live broadcast screen of a live broadcast room corresponding to the live broadcast card according to the address of the audio and video stream and parsing the audio and video stream; and drawing a small window interface on the current interface, and using the small window interface to play the parsed audio and video stream of the live broadcast screen.

In a second aspect, the present application provides a method for switching and displaying live broadcast screen content on a mobile device, including the following steps:

displaying multiple live broadcast cards on a current interface to identify a user's touch action on a first live broadcast card in the current interface; acquiring an audio and video stream of a live broadcast screen of a first live broadcast room corresponding to the first live broadcast card; drawing a small window interface on the current interface, and using the small window interface to play the audio and video stream of the live broadcast screen of the first live broadcast room; identifying the user's touch action on a second live broadcast card in the current interface; acquiring an audio and video stream of a live broadcast screen of a second live broadcast room corresponding to the second live broadcast card; and interrupting the playback of the audio and video stream of the live broadcast screen of the first live broadcast room in the small window interface, extracting the audio and video stream of the live broadcast screen of the second live broadcast room, and using the small window interface to play the audio and video stream of the live broadcast screen of the second live broadcast room.

In a fifth aspect, the present application provides a computer device, including: one or more processors; a memory; one or more application programs, wherein the one or more application programs are stored in the memory and configured to be executed by the one or more processors for performing a display method for live broadcast screen of live broadcast room on a mobile device according to the first aspect.

In a sixth aspect, the present application provides a computer device, including: one or more processors; a memory; one or more application programs, wherein the one or more application programs are stored in the memory and configured to be executed by the one or more processors for performing a method for switching and displaying live broadcast screen content on a mobile device according to the second aspect.

BRIEF DESCRIPTION OF THE DRAWINGS

The above-mentioned and/or additional aspects and advantages of this application will become apparent and easy to understand from the following description of the embodiments in conjunction with the accompanying drawings, in which.

DETAILED DESCRIPTION OF THE INVENTION

Figure 1:
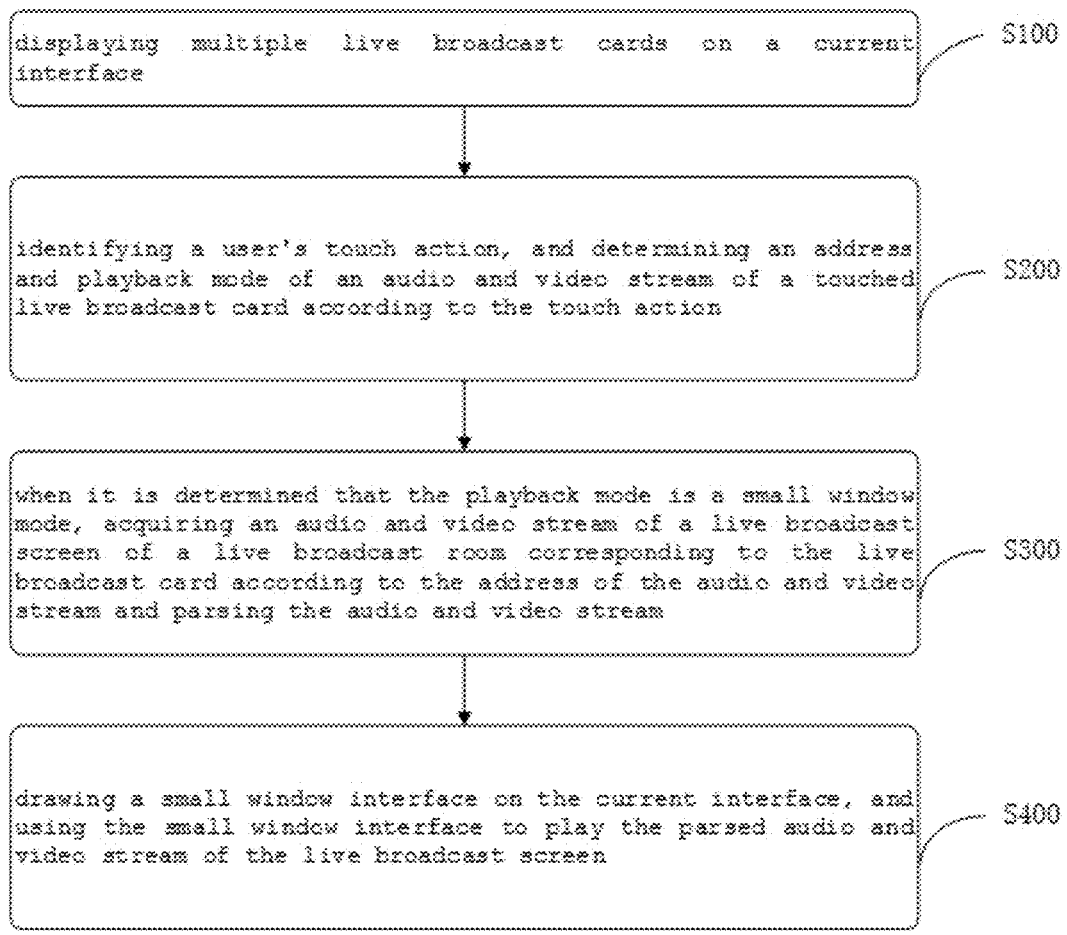
FIG. 1 is a schematic flowchart of a display method for live broadcast screen of live broadcast room according to an embodiment of this application.

The embodiments of the present application are described in detail below, and examples of the embodiments are shown in the drawings, in which the same or similar reference numerals indicate the same or similar elements or elements having the same or similar functions throughout. The embodiments described below with reference to the drawings are exemplary, and are only used to explain the present application, and cannot be construed as limiting the present application.

It should be understood by person of the ordinary skill in the art that unless otherwise specified, terms "a", "one", "the" and "said" in singular form may also be used in plural form. It should be further understood that the term "include" as used herein means presence of said feature, integer, step, operation, element and/or component, but not excluding presence of one or more additional other feature, integer, step, operation, element and/or component.

It should be understood by a person of the ordinary skill in the art that unless otherwise specified, all the terminology (including technical and scientific terms) have their ordinary meaning as understood by person of the art. It should also be understood that terms such as those defined in a general dictionary should be understood to have a meaning consistent with the meaning in the context of the prior art. And unless it is specifically defined as here, it will not be interpreted with idealized or overly formal meanings.

Those skilled in the art should understand that the concepts of "application", "application program", "application software", and similar expressions in the embodiments of the present application are the same concepts known to those skilled in the art and refer to a series of computer instructions and related data resources organically constructed computer software suitable for electronic operation. Unless otherwise specified, this definition is not limited by the type or level of programming language, nor by the operating system or platform on which it is running. Naturally, such concepts are not limited by any form of terminal.

This application provides a display method for live broadcast screen of live broadcast room on a mobile device, which can make it possible to preview the content of the live broadcast screen in the corresponding live broadcast room without entering the live broadcast room, so as to meet the needs of the user to quickly browse live broadcast content, improve the efficiency of users to find interesting live broadcast content. The method includes the following step:

S100, displaying multiple live broadcast cards on a current interface.

In one embodiment, a current interface of a live broadcasting software APP on the mobile device displays multiple live broadcast cards in a live broadcasting list. The live broadcast contents of the live broadcast rooms corresponding to multiple live broadcast cards may be different types of live broadcast contents. The live broadcast rooms corresponding to the live broadcast cards shown in the live broadcast list may be live broadcast rooms recommended to the user according to the popularity of the streamer. Therefore, it is possible to initially increase the user's search for the live broadcast content of the live broadcast room of interest. The live broadcast cards may also be live broadcast cards issued by the corresponding server according to the user's preference level after collecting the user's preference for the live broadcast rooms. Further, the live broadcast rooms corresponding to the live broadcast cards in the live broadcast list are the most popular live broadcast rooms of different types of live broadcast rooms. Thereby, it is possible to provide users with multiple types of live broadcast rooms with the most popular live broadcast rooms.

In some embodiments, step S100 may include: displaying live broadcast cards in all live broadcast lists under the home page or entertainment tab on the current interface; or displaying the live broadcast cards in the live broadcast list in the search results of a search page on the current interface.

The method also includes S200, identifying a user's touch action, and determining an address and playback mode of an audio and video stream of a touched live broadcast card according to the touch action.

In one embodiment, after the live broadcast software APP on the mobile device shows the user multiple live broadcast cards in the live broadcast list, the user's touch action is further recognized. The touch action of the user is the action of the user long-pressing the live broadcast card or the action of the user clicking the live broadcast card. Specifically, the mobile device recognizes the user's action of pressing the live broadcast card or clicking the live broadcast card. The identifying the touch action of the user may further include: identifying the user's touch action for a preset duration. In a specific embodiment, the mobile device detects whether a user's pressing operation on a corresponding live broadcast card is received, and whether the duration of the pressing operation reaches a preset duration. The preset duration may be a preset duration set in advance according to user operation habits. For example, the preset duration may be 5 seconds.

Further, after recognizing the user's touch action, the mobile device obtains the audio and video stream address of the live broadcast card touched by the user according to the touch action and determines the play mode of the live broadcast card. Specifically, the mobile device communicates with a background server of the live broadcast software APP through a network, and obtains the address of the audio stream and video stream of the touched live broadcast card from the background server. At the same time, the play mode of the live broadcast card is determined according to the user's touch action on the live broadcast card. Here, the play mode of the live broadcast card includes a small window mode and a large window mode. The small window mode is to draw a small window interface on the current interface and play the live broadcast content corresponding to the live broadcast card on the small window interface. In one embodiment, the large window mode is a play mode for entering a live broadcast room corresponding to a live broadcast card.

In an embodiment, after detecting that the user touches the corresponding live broadcast card for a preset duration, the mobile device obtains the audio and video stream address of the live broadcast screen corresponding to the live broadcast card. That is, the mobile device obtains the audio and video stream address of the live broadcast content corresponding to the live broadcast room, but does not include the information stream address of content such as a public display screen and gift effects.

The method also includes S300, when it is determined that the playback mode is a small window mode, acquiring an audio and video stream of a live broadcast screen of a live broadcast room corresponding to the live broadcast card according to the address of the audio and video stream and parsing the audio and video stream.

In one embodiment, after the mobile device obtains the audio and video addresses of the touched live broadcast card and confirms the play mode of the live broadcast card, when the playback mode is the small window mode, the audio and video stream of the live broadcast screen of the live broadcast room corresponding to the touched live broadcast card is obtained from the corresponding background server according to the obtained audio stream address. At the same time, the audio and video stream is parsed.

The method also includes S400, drawing a small window interface on the current interface, and using the small window interface to play the parsed audio and video stream of the live broadcast screen.

In one embodiment, after determining that the play mode of the touched live broadcast card is the small window mode, a small window interface is drawn on the current interface of the mobile device. The mobile device uses the drawn small window interface to play the audio and video stream of the live broadcast screen parsed in step S300. The drawn small window interface is the global top playback interface. Therefore, the small window interface can be suspended over all live broadcast cards of the live broadcast list on the current interface. In addition, the small window interface may move on the current interface according to the user's dragging action. The moving range may be from below the system status bar at the top of the screen of the page where the live broadcast list is located to the area at the bottom of the operation bar. The user can use the small window interface to view the content of the live broadcast screen of the corresponding live broadcast room, and drag the small window interface on the current page according to personal preferences. Therefore, the user experience can be further improved.

At the same time, after playing the parsed audio and video stream of the live broadcast screen using the small window interface, it may further include: recognizing the user's action of opening the bullet comment of the small window interface, obtaining the bullet comment information flow of the live broadcast screen played on the small window interface, and displaying the bullet comment information of the live broadcast screen corresponding to the live broadcast room on the small window interface.

Figure 4:
FIG. 4 is a diagram showing the effect of a user interface when using the display method for live broadcast screen of live broadcast room in the embodiment of FIG. 1.

In a specific embodiment, as shown in FIG. 4, in the live broadcast list of the current interface, the user long-presses the live broadcast card in the live broadcast list to display the small window interface (There is no need to return from the live broadcast room first, so even if the [small window] switch in the setting is off, the small window interface can still be displayed). The live broadcast content of the live broadcast screen of the live broadcast room corresponding to the long-pressed live broadcast card is played in the small window interface.

Figure 2:
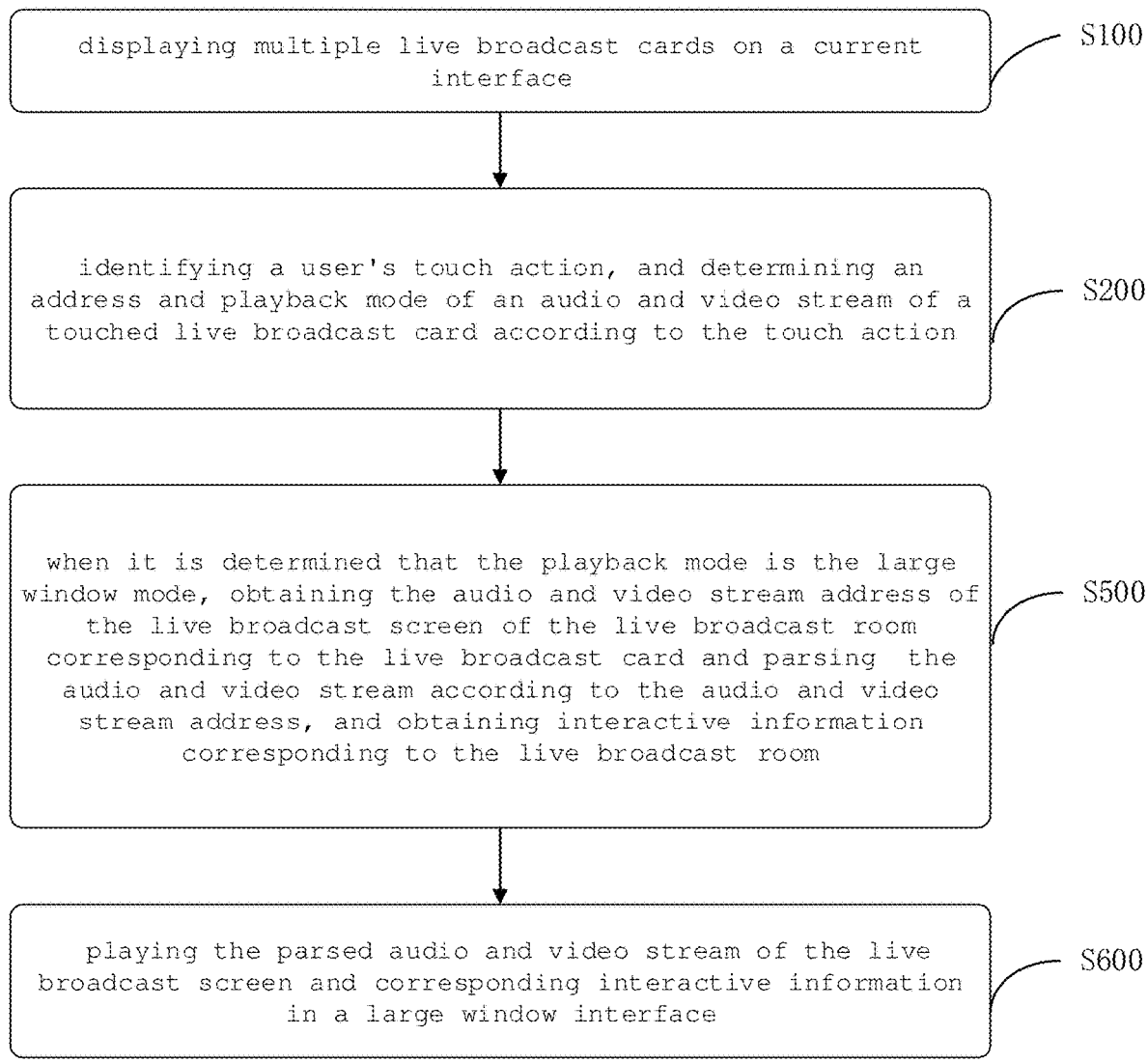
FIG. 2 is a schematic flowchart of a display method for live broadcast screen of live broadcast room according to another embodiment of this application.

In one embodiment, as shown in FIG. 2, step S200 may further include the following steps:

S500, when it is determined that the playback mode is the large window mode, obtaining the audio and video stream address of the live broadcast screen of the live broadcast room corresponding to the live broadcast card and parsing the audio and video stream according to the audio and video stream address, and obtaining interactive information corresponding to the live broadcast room; and S600, playing the parsed audio and video stream of the live broadcast screen and corresponding interactive information in a large window interface.

In one embodiment, when the mobile device determines that the playback mode of the touched live broadcast card is the large window mode, according to the audio and video stream address of the live broadcast screen of the live broadcast room corresponding to the live broadcast card obtained from the background server, the mobile device obtains the audio and video stream of the live broadcast screen in the corresponding live broadcast room. At the same time, the mobile device also obtains the interactive information corresponding to the live broadcast room from the background server. The interactive information may be the interactive information between the streamer and the fans in the live broadcast room, and related information in the live broadcast room. For example, it may be the live broadcast content screen, bullet comment, gift display frame, fan interaction area, weekly leaderboard of the live broadcast of the streamer.

Further, the mobile device plays the audio and video stream of the live broadcast screen parsed by the live broadcast room and the corresponding interactive information in the large window interface. In one embodiment, the large window interface is a live broadcast room interface. At this time, not only the live broadcast screen of the live broadcast room but also the public screen of the live broadcast room and the gift effect are displayed in the large window interface. The user can watch the live broadcast screen in the live broadcast room and interact with the streamer of the live broadcast room.

Figure 3:
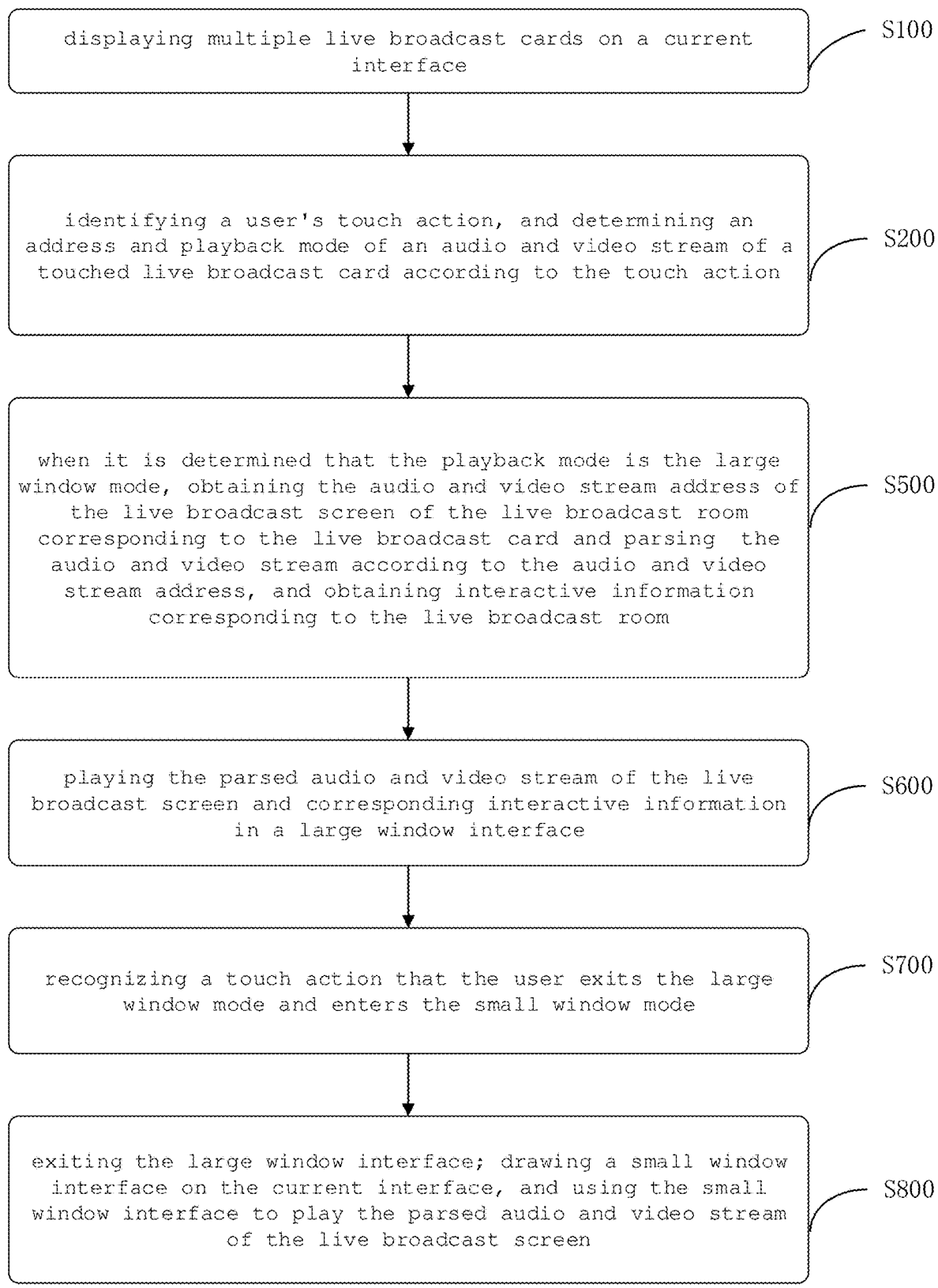
FIG. 3 is a schematic flowchart of a display method for live broadcast screen of live broadcast room according to yet another embodiment of this application.

In one embodiment, as shown in FIG. 3, after step S600, the following steps may also be included:

S700, recognizing a touch action that the user exits the large window mode and enters the small window mode; and S800: exiting the large window interface; drawing a small window interface on the current interface, and using the small window interface to play the parsed audio and video stream of the live broadcast screen.

In one embodiment, after the mobile device uses the large window interface to play the audio and video stream of the live broadcast screen of the touched live broadcast card, when it is determined that the user has exited the current playback mode of the large window interface and entered the play mode of the small window interface (It can be the user clicking or long-pressing the current big window interface). At the same time a small window interface is drawn on the current interface, and the drawn small window interface is used to play the audio and video stream of the live broadcast screen of the live broadcast room played by the large window interface.

In one embodiment, before step S400, the method may further include the following steps: determining the shape attribute of the live broadcast screen corresponding to the touched card according to the touch action. The drawing of the small window interface on the current interface includes: drawing the small window interface according to the shape attribute of the live broadcast screen.

Here, the shape attributes of the live broadcast screen include a half-screen shape and a vertical screen shape. Determining the shape attribute of the live broadcast screen of the live broadcast room corresponding to the touched card according to the touch action, and drawing the small window interface according to the shape attribute of the live broadcast screen, includes: If it is determined that the shape attribute of the live broadcast screen corresponding to the touched card is a half-screen shape, drawing a half-screen small window interface according to the half-screen live broadcast screen; and if it is determined that the shape attribute of the live broadcast screen corresponding to the touched card is a vertical screen shape, a vertical window-shaped small window interface is drawn according to the vertical screen shaped live screen.

Specifically, if the shape attribute of the live broadcast screen corresponding to the live broadcast card is a half-screen shape, the video stream of the live broadcast screen of the half-screen live broadcast room is adaptively adjusted, and the adjusted video stream is played using the small window interface of the half-screen shape. If the shape attribute of the live broadcast screen corresponding to the live broadcast card is a vertical screen shape, the video stream of the live broadcast screen in the vertical screen shaped live broadcast room is adaptively adjusted, and the vertical screen-shaped small window interface is used to play the adjusted video stream.

In one embodiment, before step S400, the method may further include the following steps: detecting whether a terminal supports the small window interface to play the audio and video stream of the live screen; and prompting the user to open small window interface playback settings, if the terminal does not support the small window interface to play the audio and video stream of the live broadcast screen.

Specifically, after detecting that the user is about to use the small window interface to play the live broadcast screen content of the touched live broadcast card, it is detected whether the mobile device supports the small window interface to play the audio and video streams of the live broadcast screen of the live broadcast room. If the mobile device does not support it, the user is prompted to open the small window interface playback settings. After detecting that the user opens the playback settings of the small window interface, a small window interface is drawn on the current interface and the small window interface is used to play the audio and video stream of the live broadcast screen of the live broadcast room. Or, when it is detected that the system of the mobile device does not support playback in the small window interface, confirm to exit the large window interface and return to the page where the live broadcast list of the current interface in the live broadcast room is located.

In one embodiment, after displaying multiple live broadcast cards on the current interface, and before identifying the user's touch action, the method may further include the following steps: obtaining the frequency of users entering and leaving the live broadcast room corresponding to the current interface in the past; and when it is confirmed that the frequency satisfies a preset condition, the user is prompted to touch the live broadcast card to preview the small window interface when the user last quits the live broadcast room.

In one embodiment, the mobile device obtains the frequency of the user entering and leaving the live broadcast room in the live broadcast list of the current interface. In a specific embodiment, the mobile device may count the number of times the user enters and exits the live broadcast room in the live broadcast list within a period of time, and obtain the frequency of the user entering and leaving the live broadcast room in the live broadcast list during the period of time. Further, the mobile device determines whether the frequency meets a preset condition. If the frequency meets the preset condition, the user is prompted to long-press the live broadcast card corresponding to the live broadcast room to preview in a small window. The preset condition can be that the user exits the live broadcast room twice within 1 minute.

Figure 5:
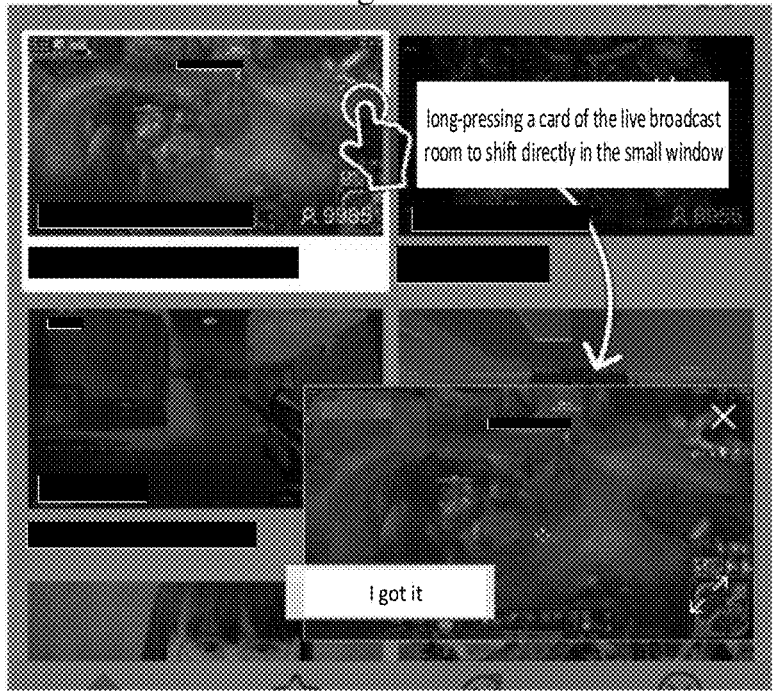
FIG. 5 is a diagram showing an interface illustrating a user prompt when using the display method for live broadcast screen of live broadcast room in the embodiment of FIG. 1.

Specifically, as shown in FIG. 5, when the mobile device determines that the user frequently enters and exits the live broadcast room (for example, exits the live broadcast room twice within 1 minute), a prompt appears on the screen when the user last quits the live broadcast room. In this embodiment, this prompt appears only once. After confirming that the user clicked [I got it], this prompt disappeared.

In one embodiment, prompting the user to touch the live broadcast card to preview the small window interface may further include: obtaining the user's confirmation instruction; and canceling the prompt that the user touches the live broadcast card to preview the small window interface. That is, after the terminal displays the small window interface preview prompt to the user, if the user clicks the cancel prompt, the user will no longer be prompted to preview the small window interface.

In one embodiment, when the user last quits the live broadcast room, the user is prompted to long-press the live broadcast card corresponding to the live broadcast room to preview the small window interface. After the frequency of the user entering and leaving the live broadcast room in the live broadcast list satisfies the preset condition, each time the user exits the live broadcast room, the user is reminded to long-press the live broadcast card corresponding to the live broadcast room to preview the small window interface. After receiving the user's instruction to cancel the prompt, the user will no longer be prompted to preview the small window interface.

In one embodiment, after identifying the user's touch action in step S200, the method may further include: displaying information about the live broadcast room corresponding to the live broadcast card. The information of the live broadcast room may include personal information of the streamer, classification information of live broadcast content in the live broadcast room, and tag information of the live broadcast room. The mobile device displays the information of the live broadcast room corresponding to the live broadcast card to the user, so that the user can have a preliminary understanding of the live broadcast room, so as to determine whether the live broadcast content of the live broadcast room is an interesting live broadcast content, and further improve the user's efficiency in finding interesting live broadcast content.

In one embodiment, after step S400, it may further include: obtaining live broadcast cards of live broadcast rooms with a preset number of user visits which are within a preset ranking range in a preset period; recommending to the user the live broadcast cards of the live broadcast rooms with the preset number of user visits; when receiving the user's play instruction, playing alternatively the video stream of the live broadcast screen of the live broadcast rooms having the preset number of user visits with a preset duration on the small window interface; and when the small window interface receives a touch instruction, it enters the currently broadcast live broadcast room.

In one embodiment, the mobile device obtains the number of times the user enters the live broadcast rooms corresponding to all live broadcast cards in the live broadcast list on the current interface during a preset period, and further filters out the live broadcast cards of the live broadcast rooms where the number of user entries is ranked within a preset ranking range. In a specific embodiment, the live broadcast cards of the live broadcast rooms having top 3 user entries can be selected. After the mobile device obtained live broadcast cards of live broadcast rooms with a preset number of user visits which are within a preset ranking range in a preset period, it further recommends to the user the live broadcast cards of the live broadcast rooms with the preset number of user visits, in order to recommend the live broadcast contents of the live broadcasts room that the user may be interested in, according to the number of times the user enters the live broadcast cards. When the mobile device receives the user's playback instruction, for example, the user clicks or long-presses the recommended live broadcast card of the live broadcast room, the video stream of the live broadcast screen of the live broadcast room with the preset number of user visits and the preset duration is alternately played in the small window. When the small window interface receives the touch instruction, it enters the live broadcast room currently played by the small window.

Specifically, the touch instruction may be clicking or pressing a small window interface. When the small window interface receives a user clicking or pressing instruction, the mobile device will enter the live broadcast room currently played on the small window interface. That is, when the user previews the content of the live broadcast screen of the live broadcast room on the small window interface, if the user is interested in the content of the current live broadcast screen, the user can click or press the small window to enter the corresponding live broadcast room.

In an embodiment, after step S400, it may further include: obtaining the number of clicks of the live broadcast card corresponding to the video stream of the live broadcast screen of the live window in the small window interface in the live broadcast list of the current interface, and uploading a label of the corresponding live broadcast card according to the number of clicks.

In a specific embodiment, the mobile device obtains the live broadcast card long-pressed by the user in the live broadcast list, and triggers the small window interface to preview the number of clicks on the live broadcast content of the corresponding live broadcast room, and uploads the name of the column where the long-pressed live broadcast card is located, and treats it as a label, such as homepage, glory of the king, search, etc.

In the method for live broadcast screen of live broadcast room on a mobile device provided by this application, by recognizing the user's touch action on the live broadcast card, the audio and video stream address and playback mode of the touched live broadcast card are determined according to the touch action. When determining that the live broadcast card playback mode is the small window mode, the audio and video stream of the live broadcast screen of the live broadcast room corresponding to the live broadcast card is acquired and parsed according to the corresponding audio and video stream address. At the same time, a small window interface on the current interface is drawn and used to play the parsed audio and video stream of the live broadcast screen. Therefore, the user can preview the content of the live broadcast screen of the corresponding live broadcast room through the small window interface to determine whether the user is interested in the live broadcast content in the live broadcast room, and therefore, the efficiency of the user looking for interesting live broadcast content is improved.

In the method for live broadcast screen of live broadcast room on a mobile device provided by this application, when it is determined that the touched live broadcast card playback mode is the big window mode, the audio and video stream of the live broadcast screen of the live broadcast room of the live broadcast card and the interactive information corresponding to the live broadcast room can also be played on the big window interface. Therefore, the user can be provided with a variety of playback modes for playing live broadcast cards, which improves the user experience.

Furthermore, in the method for live broadcast screen of live broadcast room on a mobile device provided by this application, the terminal can also obtain the frequency that the user used to enter and leave the live broadcast room corresponding to the current interface. When the user recently quit the live broadcast room, the user is prompted to touch the live broadcast card to preview the small window interface, which can further improve the user experience.

Figure 6:
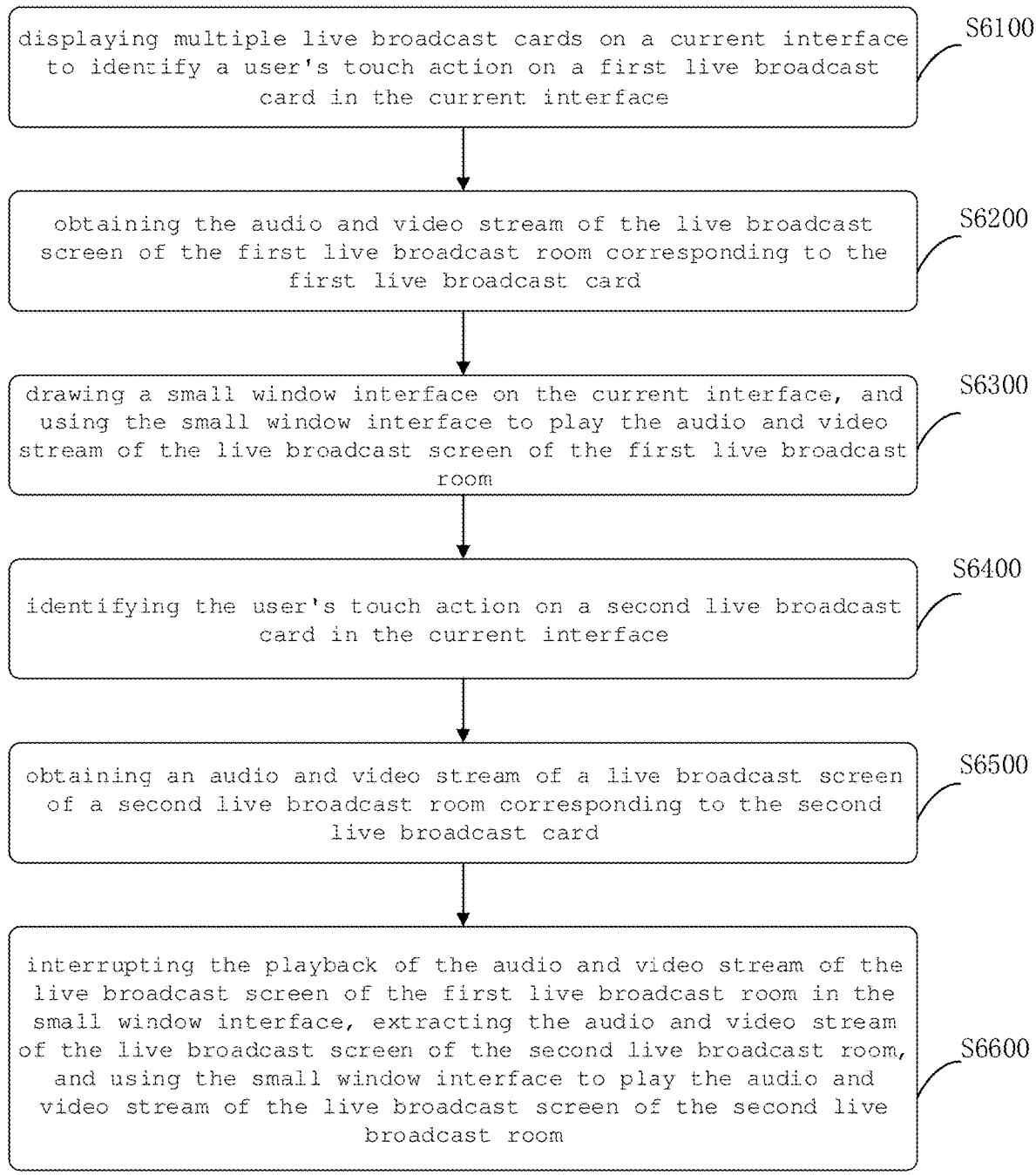
FIG. 6 is a schematic flowchart of a method for switching and displaying live broadcast screen content according to an embodiment of this application.

The present application also provides a method for switching and displaying live broadcast screen content on a mobile device. As shown in FIG. 6, in one embodiment, the method for switching and displaying live broadcast screen content on a mobile device includes the following step:

S6100, displaying multiple live broadcast cards on a current interface to identify a user's touch action on a first live broadcast card in the current interface.

In one embodiment, the current interface of a live broadcast software APP on the mobile device displays the live broadcast list to the user. The live broadcast list includes multiple live broadcast cards, and each live broadcast card displays a theme screen corresponding to the live broadcast room. The live broadcast room corresponding to the live broadcast card displayed to the user in the live broadcast list may contain various types of live broadcast room content, for example, live broadcast rooms for entertainment, live broadcast rooms for games, and live broadcast rooms for food. Each live broadcast card displays the theme of the live broadcast content corresponding to the live broadcast room, so that the user can initially understand the live broadcast content of the corresponding live broadcast room through the theme of the live broadcast content. At the same time, a static screen corresponding to the live broadcast content in the live broadcast room is displayed on the live broadcast card. The User can determine whether they are in line with his personal preference based on the static screen of the live broadcast card and the live broadcast content theme displayed on the card, so as to decide whether to enter the corresponding live broadcast room.

In one embodiment, the live broadcast card in the live broadcast list may be a live broadcast card corresponding to the live broadcast room with the top ranked popularity of the streamer after ranking according to the popularity of the streamer. Alternatively, after ranking according to the popularity of the live broadcast type, the live broadcast card corresponding to the live broadcast room with a high live broadcast type popularity may be displayed. The live broadcast list can also display the live broadcast cards corresponding to the live broadcast rooms according to the popularity of the type of live broadcast and the popularity of the streamers of the live broadcast rooms. Therefore, it can initially help the user to find the live broadcast content of the live broadcasting room of interest. At the same time, the live broadcast room corresponding to the live broadcast card in the live broadcast list is the most popular live broadcast room among different types of live broadcast rooms. In this way, the user can be provided with various types of live broadcast rooms with the highest ranking corresponding to the popularity of the live broadcast rooms.

After showing the user multiple live broadcast cards, the mobile device recognizes the user's touch action on the first live broadcast card in the current interface. Here, the user's touch action recognized by the mobile device may be that the user clicks on the live broadcast card in the live broadcast list or the user long-presses the live broadcast card in the live broadcast list. The content in the live broadcast room corresponding to the live broadcast card includes the live broadcast screen, public screen, and gift effect of the live broadcast room.

The method for switching and displaying live broadcast screen content on a mobile device includes the following step:

S6200, obtaining the audio and video stream of the live broadcast screen of the first live broadcast room corresponding to the first live broadcast card.

In one embodiment, after the mobile device recognizes the user's touch action on the first live broadcast card in the current interface, the audio and video stream of the live broadcast screen of the live broadcast room corresponding to the live broadcast card is obtained.

In a specific embodiment, step S6200 includes: acquiring the audio and video stream address of the live broadcast screen of the first live broadcast room corresponding to the first live broadcast card; and obtaining the audio and video stream of the live broadcast screen in the live broadcast room, according to the audio and video stream address of the live broadcast screen in the first live broadcast room. Specifically, after recognizing the user's touch action on the first live broadcast card of the current interface, the mobile device communicates with a background server, and obtains the audio and video stream address of the live broadcast screen of the live broadcast room corresponding to the live broadcast card from the background server. Further, according to the audio and video stream address, the audio and video stream of the live broadcast screen of the live broadcast room corresponding to the live broadcast card is obtained from the background server, and the audio and video stream is parsed so that the audio and video stream can be played on the mobile device.

The method for switching and displaying live broadcast screen content on a mobile device includes the following step:

S6300, drawing a small window interface on the current interface, and using the small window interface to play the audio and video stream of the live broadcast screen of the first live broadcast room.

In one embodiment, after the mobile device recognizes the user's touch action on the live broadcast card and obtains the audio and video stream of the live broadcast screen corresponding to the live broadcast card, the small window interface is drawn in the currently displayed interface within a preset time. The drawn window interface may be a window interface with global attributes. In other words, the small window interface can be suspended on an upper layer of all live broadcast cards in the live broadcast list of the current interface. And, when the user's dragging motion is recognized, the drawn small window interface moves according to the user's dragging motion.

Specifically, the small window interface is set to the global top attribute. Therefore, when using the small window interface to play the audio and video streams of the live broadcast screen in the live broadcast room, the user can exit the current interface or exit the live broadcast software APP. Therefore, the user can perform other operations on the mobile device while watching the audio and video streaming content of the small window interface. For example, users can use chat software to chat with friends while watching the content of the small window interface.

In one embodiment, the small window interface drawn on the current interface is a play window that has a preset size and is set on the current interface where the live broadcast list is located. The playing window is smaller than that of a traditional live broadcasting room. In one embodiment, the small window interface may be set to be a play window with the same size as the live broadcast card in the live broadcast list.

In other embodiments, the small window interface may also be a player independent of the current interface. The mobile device uses a small window player independent of the current interface where the live broadcast list corresponding to the live broadcast room locates to play the corresponding audio and video stream. When the user uses the player to play the live broadcast screen of the live broadcast room, the small window player can be suspended on the upper layer of other applications. For example, the small window player can be suspended on chat applications such as WeChat and QQ, and users can watch live broadcast content played by the small window player while chatting. Therefore, the user experience can be enhanced and the user's usage time can be improved.

Figure 7:
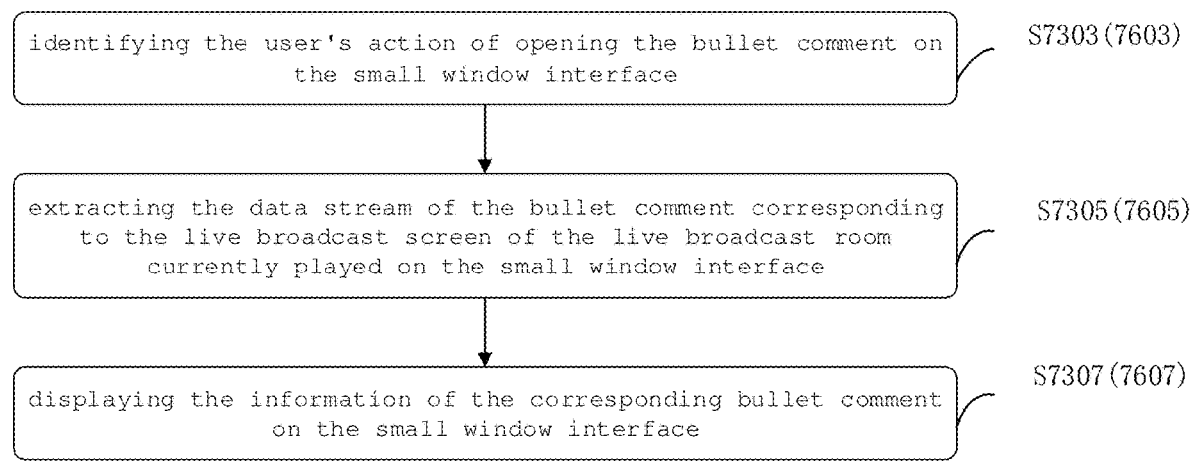
FIG. 7 is a schematic flowchart of an embodiment of step S6300 or step S6600.

In one embodiment, as shown in FIG. 7, after "using the small window interface to play the audio and video stream of the live broadcast screen of the first live broadcast room" in step S6300, the following steps may be further included:

S7303: identifying the user's action of opening the bullet comment on the small window interface;

S7305: extracting the data stream of the bullet comment corresponding to the live broadcast screen of the live broadcast room currently played on the small window interface; and S7307: displaying the information of the corresponding bullet comment on the small window interface.

Specifically, when the user uses the small window interface to play the audio and video stream of the live broadcast screen of the first live broadcast room, when the bullet comment of the live broadcast room is opened on the small window interface, the bullet comment information stream corresponding to the live broadcast screen of the currently broadcast live broadcast room is pulled and the corresponding bullet comment information is displayed on the small window interface. In one embodiment, when it is detected that the small window interface plays the audio and video stream of the live broadcast screen of the first live broadcast room, the bullet comment information of the live broadcast screen of the live broadcast room may be preloaded. When recognizing that the user opens the bullet comment of the small window interface, the corresponding bullet comment information is displayed on the small window interface.

In one embodiment, after "using the small window interface to play the audio and video stream of the live broadcast screen of the first live broadcast room" in step S6300, it may further include: recognizing the touch action of the user entering the corresponding live broadcast room from the small window interface; and entering the live broadcast room corresponding to the audio and video stream of the live broadcast screen currently played on the small window interface. Specifically, when the user uses the small window interface to play the audio and video stream of the live broadcast screen of the first live broadcast room, the user may click on the small window interface to enter the first live broadcast room. That is, the mobile device recognizes the touch action of the user entering the first live broadcast room from the small window interface (for example, the user clicks a button to enter the live broadcast room on the small window interface) to enter the first live broadcast room. Therefore, the user experience can be improved.

In one embodiment, before "using the small window interface to play the audio and video stream of the live broadcast screen of the first live broadcast room" in step S6300, it may further include: obtaining the shape attribute of the live broadcast screen of the live broadcast room corresponding to the audio and video stream played by the small window interface; and using the small window interface to play the audio and video stream of the live broadcast screen of the first live broadcast room. The shape attribute of the live broadcast screen in the live broadcast room includes half-screen shape and vertical screen shape.

In an embodiment, if the shape attribute of the live broadcast screen of the first live broadcast room is a half-screen shape, the video stream of the live broadcast screen of the first live broadcast room of the half-screen shape is adaptively adjusted. The half-screen small window interface is used to play the adjusted audio and video stream. If the shape attribute of the live broadcast screen of the first live broadcast room is a vertical screen shape, the video stream of the live broadcast screen of the first live broadcast room in the vertical screen shape is adaptively adjusted, and the vertical screen-shaped small window interface is used to play the adjusted Audio and video streaming.

Figure 13:
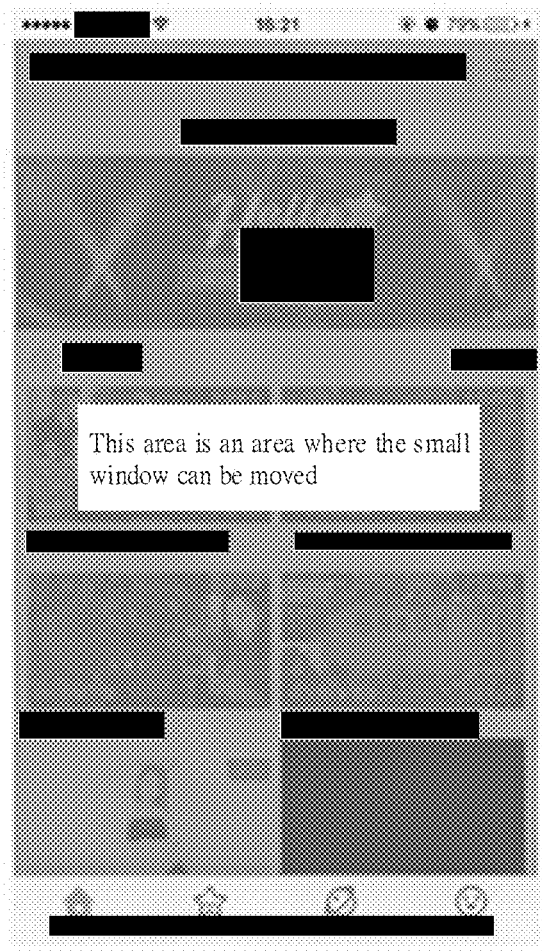
FIG. 13 is a diagram showing the dragging range of the small window interface according to an embodiment of the present application.

Specifically, when the mobile device detects that the live broadcast screen of the live broadcast room is a half-screen live broadcast screen, after adaptively adjusting the audio and video streams of the live broadcast screen of the live broadcast room, the small window interface corresponding to the half-screen shape is used to play the adjusted audio and video stream. When the mobile device detects that the live broadcast screen of the live broadcast room is in a vertical screen shape, after adaptively adjusting the audio and video streams of the live broadcast screen of the live broadcast room, the small window interface corresponding to the vertical screen shape is used to play the adjusted audio and video stream. The small window interface for playing a live broadcast screen in the form of a vertical screen or a half screen is suspended above all cards in the live broadcast list, and can be moved according to the user's drag operation. The dragging range of the small window interface is: from the system status bar at the top of the current interface of the live broadcasting software to the operation bar at the bottom. The left and right sides of the current interface of the live broadcast software may have margins (see FIG. 13).

The method for switching and displaying live broadcast screen content on a mobile device includes the following step:

S6400, identifying the user's touch action on a second live broadcast card in the current interface.

In one embodiment, after the mobile device confirms that the user uses the small window interface to play the audio and video stream of the live broadcast screen of the first live broadcast room, it again recognizes that the user touches another live broadcast card in the live broadcast list on the current interface. Here, the user touch action recognized by the mobile device may be that the user clicks on the live broadcast card in the live broadcast list or the user long-presses the live broadcast card in the live broadcast list.

The method for switching and displaying live broadcast screen content on a mobile device includes the following step:

S6500, obtaining an audio and video stream of a live broadcast screen of a second live broadcast room corresponding to the second live broadcast card.

In one embodiment, after the mobile device recognizes that the user touches another live broadcast card in the live broadcast list on the current interface, the audio and video stream of the live broadcast screen corresponding to the live broadcast card of the live broadcast card is obtained. That is, when a user uses a small window interface to touch the live broadcast screen content of the live broadcast room corresponding to the live broadcast card on the touch of a live broadcast card, he wants to preview the live broadcast screen content of the live broadcast room corresponding to the other live broadcast card. By user's touching of other live broadcast card, the mobile device obtains the audio and video streams of the live broadcast screen corresponding to the live broadcast card.

In a specific embodiment, step S6500 may include: obtaining the audio and video stream address of the live broadcast screen of the second live broadcast room corresponding to the second live broadcast card; and obtaining the audio and video stream of the live screen of the live broadcast room according to the audio and video stream address of the live screen of the second live broadcast room. Specifically, after recognizing the user's touch action of the second live broadcast card of the current interface, the mobile device communicates with a background server, and obtains the audio and video stream address of the live broadcast screen of the live broadcast room corresponding to the live broadcast card from the background server. Further, according to the audio and video stream address, the audio and video stream of the live broadcast screen of the live broadcast room corresponding to the live broadcast card is obtained from the background server, and the audio and video stream is parsed so that the audio and video stream can be played on the mobile device.

The method for switching and displaying live broadcast screen content on a mobile device includes the following step:

S6600, interrupting the playback of the audio and video stream of the live broadcast screen of the first live broadcast room in the small window interface, extracting the audio and video stream of the live broadcast screen of the second live broadcast room, and using the small window interface to play the audio and video stream of the live broadcast screen of the second live broadcast room.

In one embodiment, after the mobile device obtains the audio and video stream of the live broadcast screen of the live broadcast room corresponding to another live broadcast card, it interrupts the audio and video stream of the live broadcast screen of the last live broadcast room being played on the small window interface, and simultaneously extracts the audio and video stream of the live broadcast screen of the live broadcast room corresponding to the other live broadcast card, and switches the small window interface to play the audio and video stream of the live broadcast screen of the live broadcast room corresponding to another live broadcast card. Here, in this step, it is only necessary to pull the audio and video streams of the live broadcast screens corresponding to the live broadcast rooms corresponding to different live broadcast cards on the small window interface for playback, and there is no need to redraw the small window interface.

In one embodiment, the live broadcast room corresponding to each live broadcast card includes a live broadcast screen, a public screen, and a gift effect. It specifically includes the live broadcast content screen being broadcast by the streamer, bullet comment, gift display frame, fan interaction area, weekly leaderboard and the like. Here, the terminal obtains and plays only the video stream of the live screen, which does not include the public screen and the gift display effect. When the bullet comment is opened on the small window interface, the bullet comment information is displayed on the small window interface.

In one embodiment, step S6600 may include: interrupting the playback of the video stream in the audio and video stream of the live screen of the first live broadcast room in the small window interface, and maintaining the playback of the audio and video stream of the live screen of the first live broadcast room in the small window interface; extracting the audio and video stream of the live broadcast screen of the second live broadcast room; interrupting the playback of the audio stream in the audio and video stream of the live screen of the first live broadcast room in the small window interface, and while interrupting the audio stream of the live broadcast screen of the first live broadcast room, the audio interface of the live broadcast screen of the second live broadcast room is played using the small window interface.

That is, in the process of switching from playing the audio and video stream of the live broadcast screen of the first live broadcast room to playing the audio and video stream of the live broadcast screen of the second live broadcast room in the small window interface, during the switching, the small window interface first closes the video stream of the live broadcast screen in the first live broadcast room, and keeps playing the audio stream of the live broadcast screen of the first live broadcast room. Then the audio and video stream of the live broadcast screen of the second live broadcast room is extracted, and the small window interface plays the audio and video stream of the live broadcast screen of the second live broadcast room at the same moment when the audio stream of the live broadcast screen of the first live broadcast room is interrupted. Therefore, the seamless switching of the small window interface during the process of switching the audio and video streams of the live broadcast screen in the live broadcast room is maintained, and the user experience is improved. In one embodiment, as shown in FIG. 7, after "using the small window interface to play the audio and video stream of the live broadcast screen of the second live broadcast room" in step S6600, the following steps may be further included:

S7603: identifying the user's action of opening the bullet comment on the small window interface;

S7605: extracting the data stream of the bullet comment corresponding to the live broadcast screen of the live broadcast room currently played on the small window interface; and S7607: displaying the information of the corresponding bullet comment on the small window interface.

Specifically, when the user uses the small window interface to play the audio and video stream of the live broadcast screen of the second live broadcast room, and when the bullet comment of the live broadcast room in the small window interface is opened, the bullet comment information stream corresponding to the live broadcast screen of the currently broadcast live broadcast room is extracted and displayed on the small window interface. In an embodiment, when it is detected that the small window interface plays the audio and video stream of the live broadcast screen of the second live broadcast room, the bullet comment information of the live broadcast screen of the live broadcast room may be preloaded. When recognizing that the user opens the bullet comment of the small window interface, the corresponding bullet comment information is displayed on the small window interface.

In one embodiment, after "interrupting the playback of the audio and video stream of the live broadcast screen of the first live broadcast room in the small window interface" in step S6600, it may further include: buffering the audio and video stream of the live broadcast screen of the first live broadcast room; when it is confirmed that the user touches the first live broadcast card again, extracting the audio and video stream of the live broadcast screen of the first live broadcast room from a buffer area, and using the small window interface to play the audio and video stream of the live broadcast screen of the first live broadcast room. That is, the mobile device caches the interrupted audio and video stream of the live broadcast of the last live broadcast room first. When detecting that the user touches the live broadcast card corresponding to the last live broadcast room, the audio and video stream of the live broadcast screen of the live broadcast room corresponding to the live broadcast card is directly extracted from the buffer area and played. Therefore, the speed of switching and playing the audio and video streams of the live broadcast screen of the corresponding live broadcast room in the small window interface can be accelerated, and the user experience can be improved.

In one embodiment, after "using the small window interface to play the audio and video stream of the live broadcast screen of the second live broadcast room" in step S6600, it may further include: recognizing the touch action of the user entering the corresponding live broadcast room from the small window interface; and entering the live broadcast room corresponding to the live video audio and video stream currently played on the small window interface. Specifically, when the user uses the small window interface to play the audio and video stream of the live broadcast screen of the second live broadcast room, the user can click on the small window interface to enter the second live broadcast room. That is, the mobile device recognizes the touch action of the user entering the second live broadcast room from the small window interface (for example, the user clicks on the small window interface: enter the live broadcast room button) to enter the second live broadcast room. Therefore, the user experience can be improved.

In one embodiment, before "using the small window interface to play the audio and video stream of the live broadcast screen of the second live broadcast room" in step S6600, it may further include: obtaining the shape attribute of the live broadcast screen of the live broadcast room corresponding to the audio and video stream played by the small window interface; and using the small window interface to play the audio and video stream of the live broadcast screen of the second live broadcast room. The shape attribute of the live broadcast screen in the live broadcast room includes a half-screen shape and a vertical screen shape.

In one embodiment, if the shape attribute of the live broadcast screen of the second live broadcast room is a half-screen shape, the video stream of the live broadcast screen of the second live broadcast room in the half-screen shape is adaptively adjusted, and the half-screen small window interface is used to play the adjusted audio and video stream. If the shape attribute of the live broadcast screen of the second live broadcast room is a vertical screen shape, the video stream of the live broadcast screen of the second live broadcast room in the vertical screen shape is adaptively adjusted, and the vertical screen-shaped small window interface is used to play the adjusted Audio and video streaming.

Figure 10:
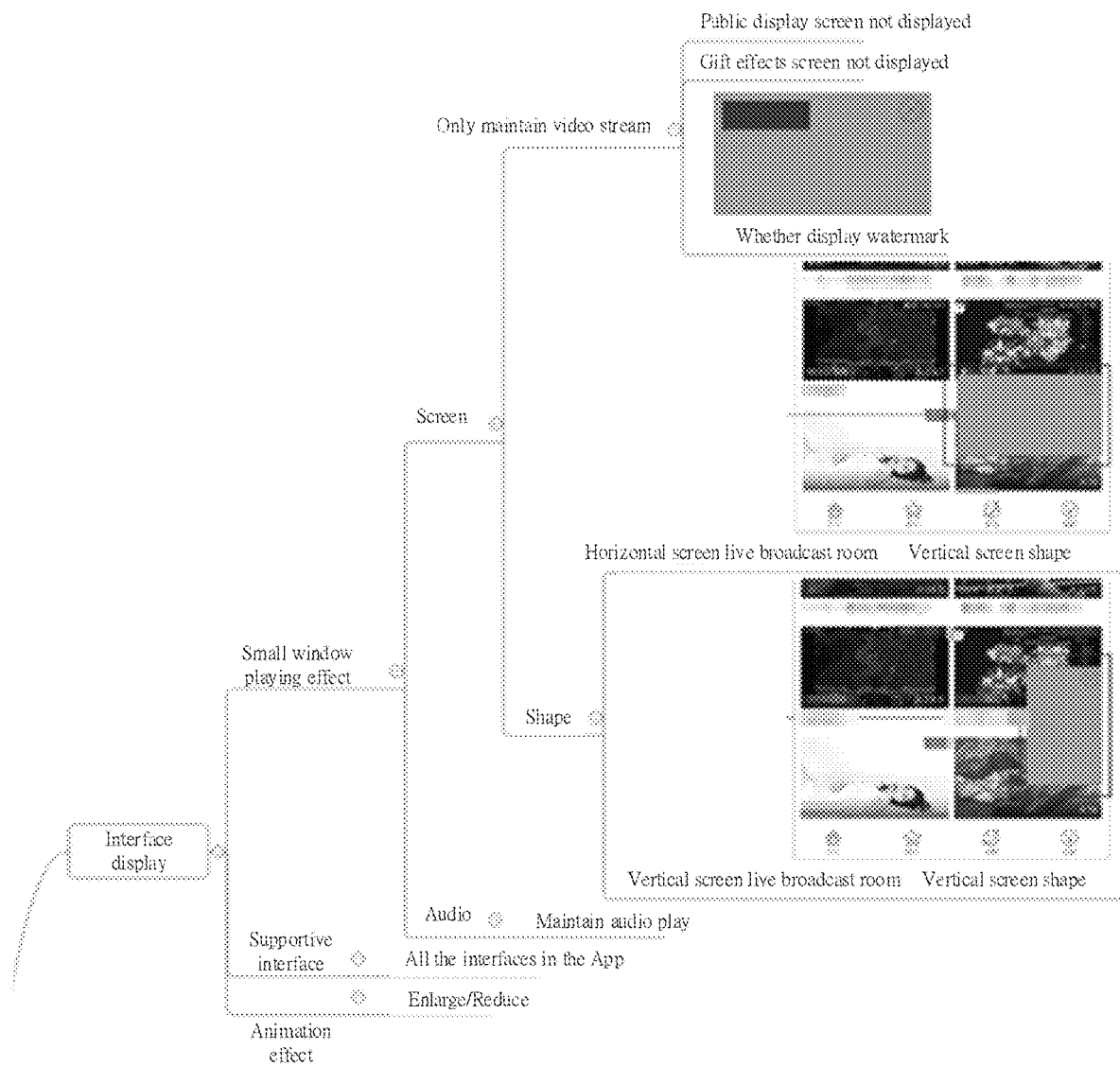
FIG. 10 is a diagram showing the effect of an interface in an embodiment of a method for switching and displaying live broadcast screen content of the present application.

Specifically, when the mobile device detects the live broadcast screen of the live broadcast room is a half-screen live broadcast screen, after adaptively adjusting the audio and video stream of the live broadcast screen of the live broadcast room, it uses the small window interface corresponding to the half-screen shape to play the adjusted audio and video stream. A small window interface for playing a live broadcast screen in the form of a vertical screen or a half screen is suspended over all cards in the live broadcast list, and can be moved according to the user's drag operation. Referring specifically to FIG. 10, the small window interface plays the video stream and audio stream of the live broadcast screen of the live broadcast room. When the shape of the live broadcast screen is a half-screen shape, a small window interface in the shape of a half screen (horizontal screen shown) is used to play the audio and video stream of the live broadcast screen (see also FIG. 11). When the shape of the live screen is a vertical screen, use the small window interface in the shape of a vertical screen to play the audio and video stream of the live screen (see also FIG. 12).

In one embodiment, in step S6300, "drawing a small window interface on the current interface" includes: drawing a small window interface in a gradient expansion mode on the current interface. In step S6300, "using the small window interface to play the audio and video stream of the live broadcast screen of the first live broadcast room" or in step S6600 "using the small window interface to play the audio and video stream of the live broadcast screen of the second live broadcast room" includes: using the small window interface to play the audio and video stream of the live broadcast screen according to the gradient expansion mode.

Or, in step S6300, "drawing a small window interface in a gradient expansion mode on the current interface" includes: on the current interface, drawing a small window interface of the expansion mode that changes according to the user's gesture. In step S6300, "using the small window interface to play the audio and video stream of the live broadcast screen of the first live broadcast room" or in step S6600 "using the small window interface to play the audio and video stream of the live broadcast screen of the second live broadcast room" includes: obtaining the user's gesture change, and using the small window interface to play the audio and video stream of the live broadcast screen according to the user's gesture change.

That is, in one embodiment, when using the small window interface to play the audio and video streams of the corresponding live broadcast screen of the live broadcast room, the small window interface can form a play window in a gradually expanding manner and play the audio and video streams of the live broadcast screens of the corresponding live broadcast room. Alternatively, the small window interface can be expanded to form a play window according to the change of the user's gesture, and play the audio and video stream of the live screen of the corresponding live broadcast room.

Figure 11A:
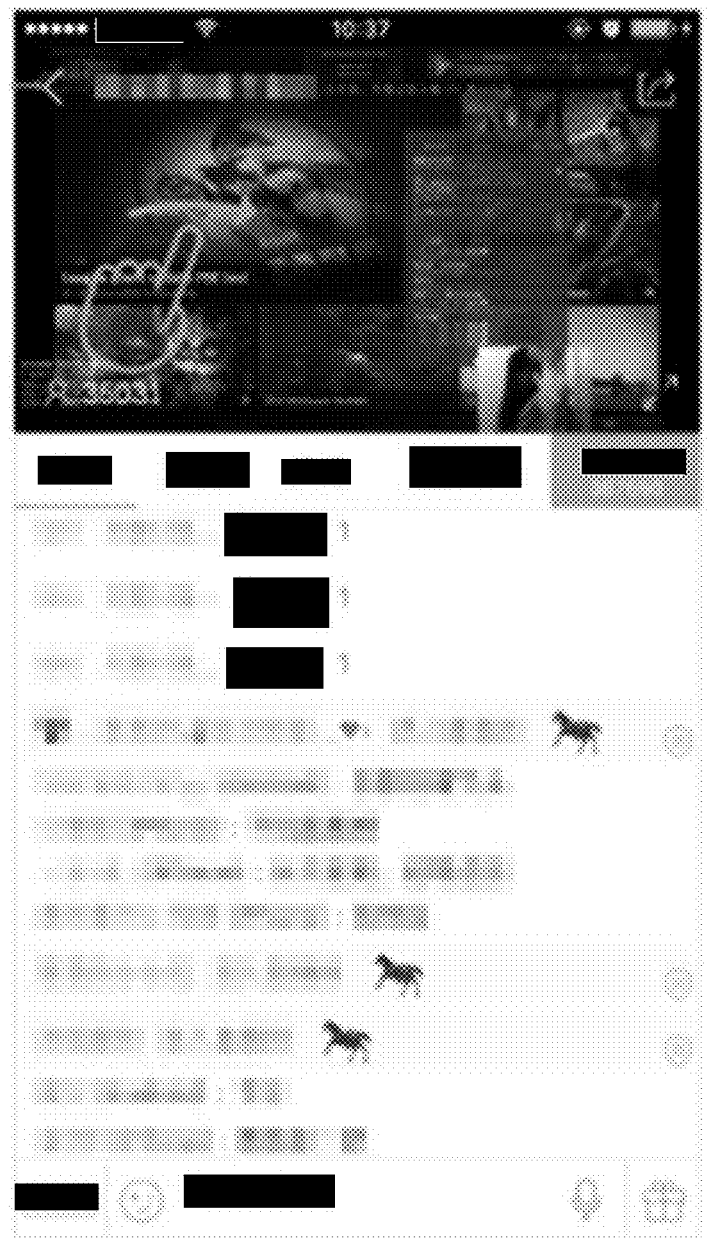
FIG. 11 is a diagram showing the effect of switching from a half-screen live window to a half-screen small window interface for playing according to an embodiment of the present application.
Figure 11B:
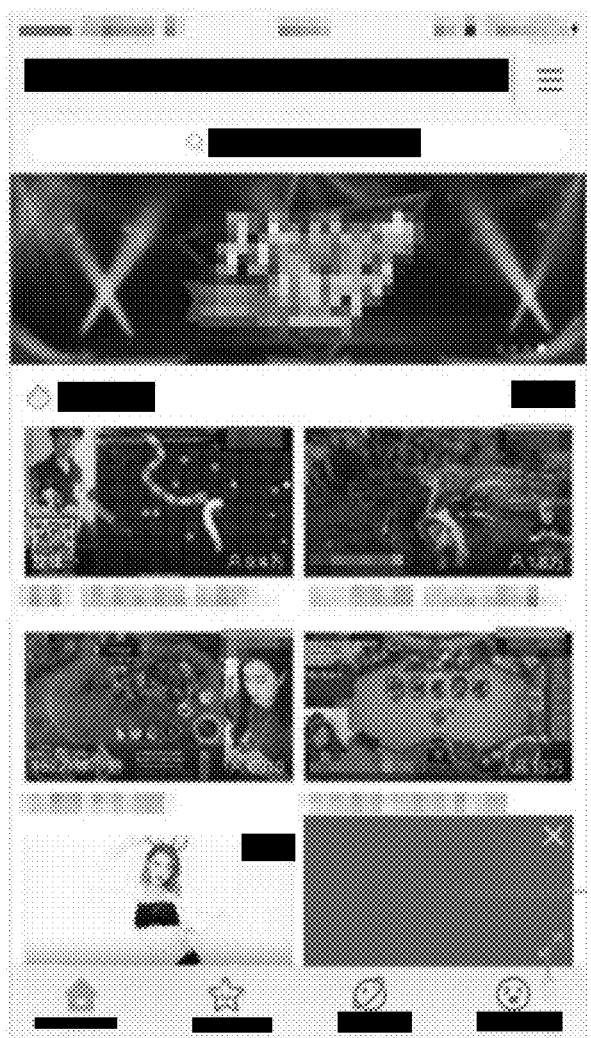
Figure 12A:
FIG. 12 is a diagram showing the effect of switching from a vertical screen live broadcast room to a vertical screen small window interface for playing according to an embodiment of the present application.
Figure 12B:

In a specific embodiment, for a live broadcast room with a half-screen shape, the user's operation gesture to the live broadcast room (for example, the user slides the video of the live broadcast screen to the right, see FIG. 11a) is obtained. The live broadcast screen in the live broadcast room gradually narrows from the upper left to the lower right corner, and it switches to the small window interface playback mode. The live broadcast software interface returns to the corresponding live broadcast list before entering the live broadcast room (see FIG. 11b). For a live broadcast room with a vertical screen shape (for example, a live broadcast room with a face attractiveness), the terminal directly obtains that after the user clicks the [Back] or [Close] button (see FIG. 12a), and the live video of the live broadcast room gradually reduces from the upper left to the lower right. It is switched to the play mode of the small window interface, and the live software interface returns to the corresponding live broadcast list before entering the live broadcast room (see FIG. 12b).

In the method for switching and displaying live broadcast screen content of this application, when the user touches a live broadcast card, the user's touch action is recognized and the audio and video stream of the live broadcast screen of the live broadcast room corresponding to the live broadcast card is obtained. At the same time a small window interface is drawn on the current interface to play the audio and video stream of the live broadcast screen. After recognizing the user's touch action of touching another live broadcast card, the audio and video stream of the small window interface is switched. That is, after the previous audio and video stream is interrupted, the audio and video stream corresponding to the next live broadcast card is played using the small window interface. Therefore, the user can preview the live broadcast screen content of the corresponding live broadcast room by touching the live broadcast card of the current interface in the live broadcast list using the small window interface. Moreover, when the user switches and touches another live broadcast card, the small window interface switches and plays the live broadcast screen content of the live broadcast room corresponding to the other live broadcast card. Therefore, there is no need for the user to enter different live broadcast rooms by constantly returning to the live broadcast list in order to find interesting live broadcast content. Furthermore, the method for switching and displaying the content of the live broadcast screen can reduce the tedious operation of continuously returning to the live broadcast list, and improve the efficiency of the user switching the live broadcast room.

Figure 8:
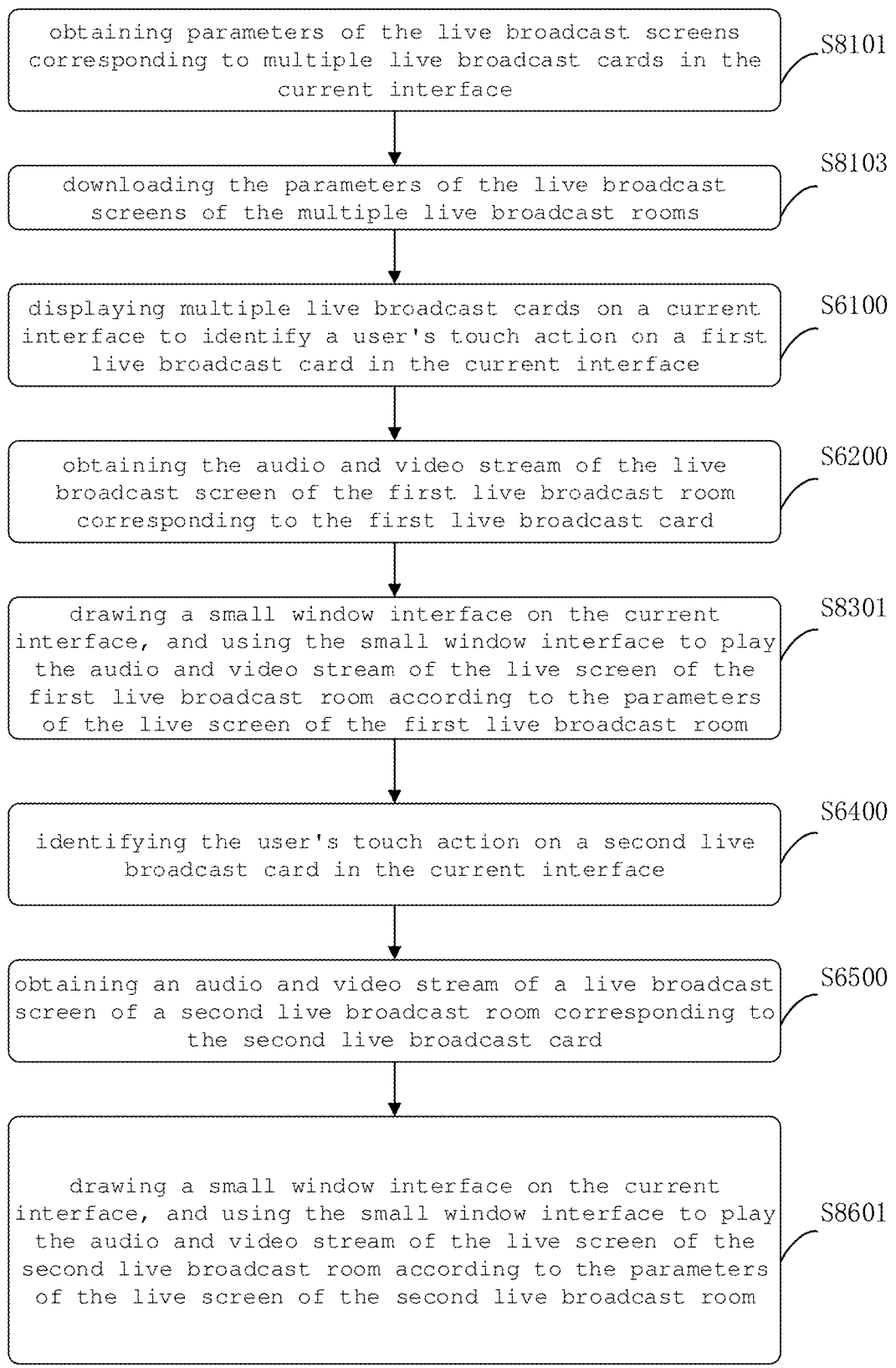
FIG. 8 is a schematic flowchart of a method for switching and displaying live broadcast screen content according to another embodiment of this application.

In one embodiment, as shown in FIG. 8, before step S6100, the following steps may also be included:

S8101: obtaining parameters of the live broadcast screens corresponding to multiple live broadcast cards in the current interface; and S8103: downloading the parameters of the live broadcast screens of the multiple live broadcast rooms.

Step S6300 includes step S8301: drawing a small window interface on the current interface, and using the small window interface to play the audio and video stream of the live screen of the first live broadcast room according to the parameters of the live screen of the first live broadcast room.

Step S6600 includes step S8601: drawing a small window interface on the current interface, and using the small window interface to play the audio and video stream of the live screen of the second live broadcast room according to the parameters of the live screen of the second live broadcast room.

That is, before using the small window interface to play the audio and video stream of the live broadcast screen of the live broadcast room, the mobile device first obtains and downloads the key parameters of the live broadcast screens corresponding to each live broadcast card to the local. Therefore, when the small window interface switches and plays the audio and video streams of the live broadcast screen of the live broadcast room according to the key parameters, the live window screen content of the live broadcast screen that is switched and played by the small window interface can be accelerated, thereby improving the user experience.

Figure 9:
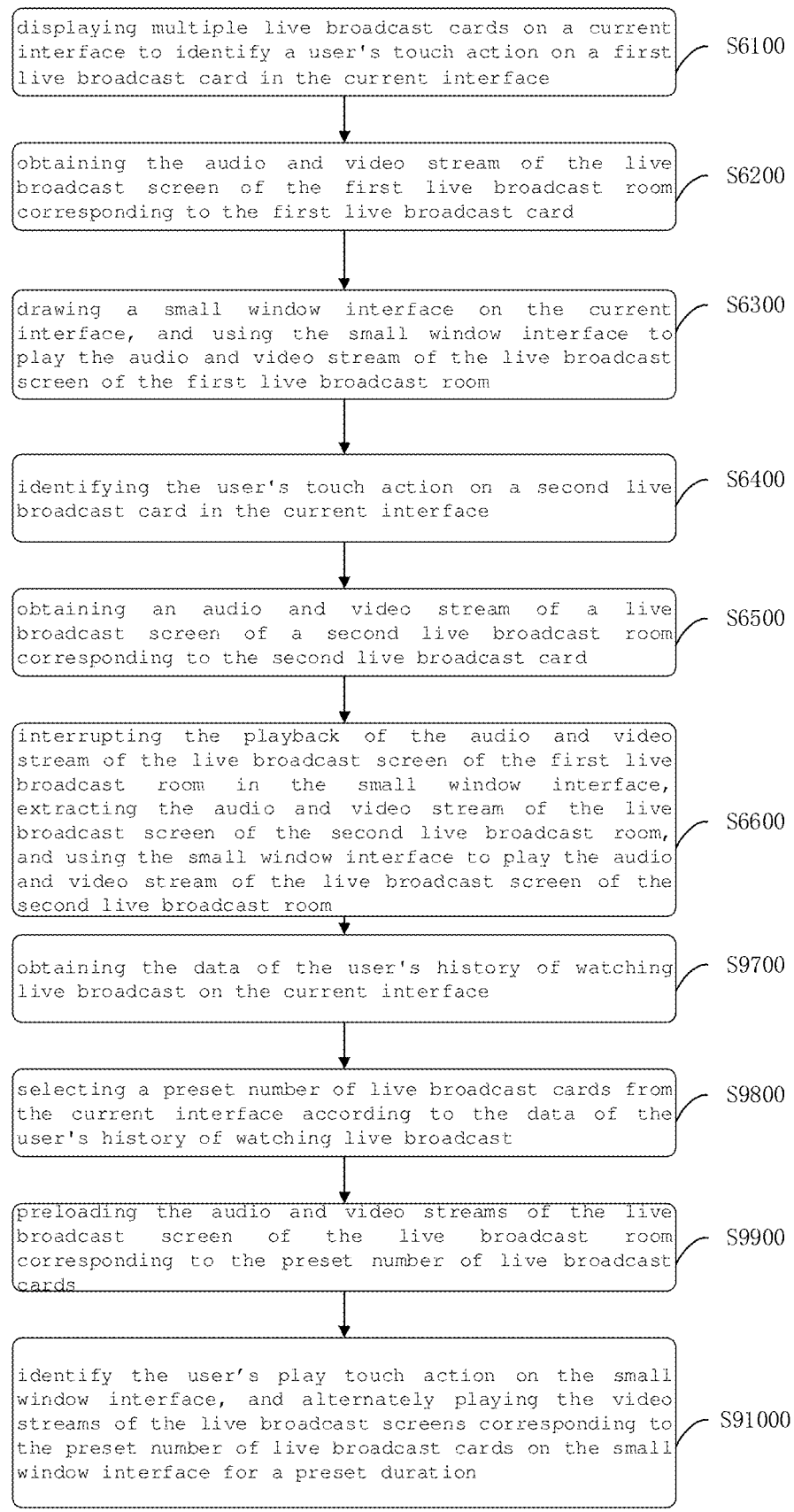
FIG. 9 is a schematic flowchart of a method for switching and displaying live broadcast screen content according to yet another embodiment of this application.

In one embodiment, as shown in FIG. 9, after step S6600, the following steps may also be included:

S9700: obtaining the data of the user's history of watching live broadcast on the current interface;

S9800, selecting a preset number of live broadcast cards from the current interface according to the data of the user's history of watching live broadcast;

S9900, preloading the audio and video streams of the live broadcast screen of the live broadcast room corresponding to the preset number of live broadcast cards; and S91000: identify the user's play touch action on the small window interface, and alternately playing the video streams of the live broadcast screens corresponding to the preset number of live broadcast cards on the small window interface for a preset duration.

In one embodiment, Here, data of the user's history of watching live broadcast includes the type of live broadcast room the user enters and the number of times of entering the live broadcast room of each type, the type data of the live broadcast room that the user has collected, and the data of the type of live broadcast room shared by the user. The data of the user's history of watching live broadcast may be data indicating the type of live broadcast rooms the user likes. Further, the mobile device selects a preset number of live broadcast cards from the first page of the live broadcast list of the current interface of the live software APP according to the acquired data of the user's history of watching live broadcast, and preloads the audio and video stream data of the live broadcast screens of the live broadcast rooms corresponding to the preset number of live broadcast cards. After recognizing the user's playing touch action on the small window interface (which may be the user clicking or long-pressing the small window interface), the preset number of audio and video streams are played in turn on the small window interface. For example, according to the data of the user's history of watching live broadcast, three live broadcast cards are obtained from the home page of the live broadcast list, and the audio and video streams of the live broadcast screens corresponding to the three live broadcast cards in the live window are played in turn on the small window interface for 30 seconds. Therefore, it is possible to improve the efficiency of the user in finding interesting live broadcast content.

In the above method for displaying and switching live broadcast content, after the live broadcast screen of the corresponding live broadcast room is played, the live data is viewed according to the user's history on the current interface, and the small window interface selects a preset number of live broadcast cards from the current interface and preloads the audio and video stream of the live broadcast screen of the live broadcast room corresponding to the preset number of live broadcast cards. When receiving the user's playback instruction, the preset number of audio and video streams with a preset duration are played in turn on the small window interface. Therefore, it is possible to improve the efficiency of the user in finding interesting live broadcast content.

In one embodiment, according to the shape attribute of the live broadcast screen of the live broadcast room corresponding to the audio and video stream, the small window interface is used to display a watermark while the corresponding audio and video stream is played. The watermark may be information showing the live broadcast platform corresponding to the live broadcast room, or information related to the live broadcast room (see FIG. 10, showing the watermark).

In one implementation, an interface processing logic that supports the playback of the corresponding audio and video stream in the small window interface is: entering the small window interface playback mode, all interfaces in the APP (application) displaying small windows, and the small window interface being located above all content.

In one embodiment, after the user clicks the live broadcast card to enter the corresponding live broadcast room, he can click the [Back] or [Close] button in the live broadcast interface of the live broadcast room, and by default, the terminal exits the live broadcast room and enters the play mode of the small window interface. At this time, the current interface of the live broadcast software returns to the interface where the live broadcast list before entering the live broadcast room is located.

Figure 14:
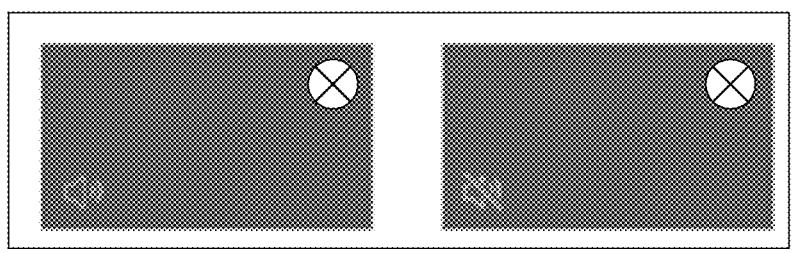
FIG. 14 is a diagram of a sound switch in a small window interface according to an embodiment of the present application.

In one embodiment, as shown in FIG. 14, the small window interface is provided with a sound switch button. The sound switch button may be provided in the lower left corner of the small window interface. The sound switch of the small window interface is turned on by default. Click the sound switch button to turn off/on the sound. Here, the sound switch only controls the sound of the small window, does not affect the sound state of the live broadcast room, and the two are independent of each other. When entering the live broadcast room, the sound state can be in accordance with the state of the live broadcast room. In addition, every time you re-enter the small window interface to play the live broadcast screen, the default sound is all on; you do not need to save the last small window sound state.

In one embodiment, when using the small window interface to play the audio and video stream of the live broadcast screen of the first live broadcast room or the audio and video stream of the live broadcast screen of the second live broadcast room, the method may further include: checking whether the user is logged in; when the user is logged in, if the user's account is confirmed to be kicked out, prompting the user he has been kicked out, displaying that the small window interface is in a loading state, and confirming that the account is used to play the corresponding video stream after logging in again; if it is confirmed that the user actively exits the login state, displaying the small window interface in a loading state, after confirming that the account is logged in again, using the small window interface to play the corresponding video stream; and when the user is in a non-login state, displaying the small window interface in a loading state, and after confirming that the account is logged in, using the small window interface to play the corresponding video stream.

Specifically, when using the small window interface to play the live broadcast screen content in the live broadcast room, the user can switch between login and non-login status. The logic of the small window is as follows:

When the user is kicked out of the login state, a prompt that the original account was kicked out pops up, the loading status is displayed on the small window interface, and then the normal small window interface is displayed after successful reconnection.

When the user actively logs out from the login state, the small window interface playback is not closed, the loading status is displayed on the small window interface, and then the normal small window interface playback is displayed after successful reconnection.

Figure 15:
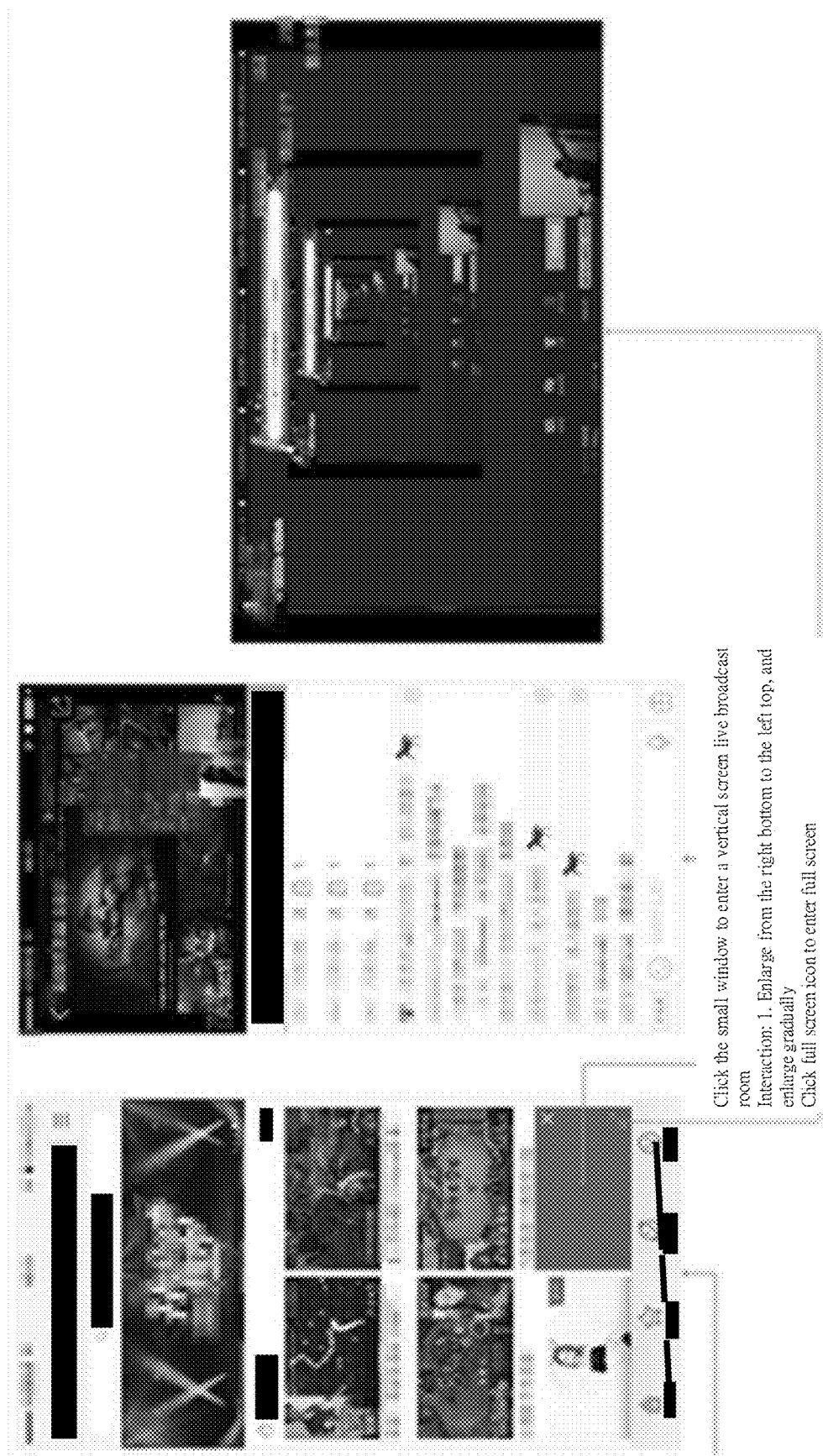
FIG. 15 is a diagram showing the effect of the process of entering the corresponding live broadcast room through the small window interface according to an embodiment of the present application.

In one embodiment, when using the small window interface to play the audio and video stream of the live broadcast screen of the first live broadcast room or the audio and video stream of the live broadcast screen of the second live broadcast room, the method may further include: confirming that the user clicks on a middle position of the small window interface; and entering the live broadcast room corresponding to the currently played audio and video stream in the small window interface. In one embodiment, as shown in FIG. 15, when the user uses the small window interface to play the audio and video stream corresponding to the live broadcast screen of the live broadcast room, after the terminal confirms that the user clicks the middle position of the small window interface, it enters the corresponding live broadcast room. When entering the live broadcast room playback mode from the small window interface playback mode, an animation effect is set for transition. Specifically, it can be set to gradually enlarge from the lower right corner to the upper left corner. Therefore, it is convenient for the user to switch between the small window interface and the live broadcast room, and the cost for the user to view the target content and return to the previous content is reduced, thereby increasing the user's use time.

In one embodiment, when the terminal enters the small window interface from the live broadcast card to play the audio and video stream corresponding to the live broadcast screen of the live broadcast room, an animation switching effect is set. The animation effect can be gradually enlarged or reduced. At the same time, when switching from the small window interface to the corresponding live broadcast room, an animation switching effect is also set. The animation effect can be gradually enlarged or reduced.

Figure 16:
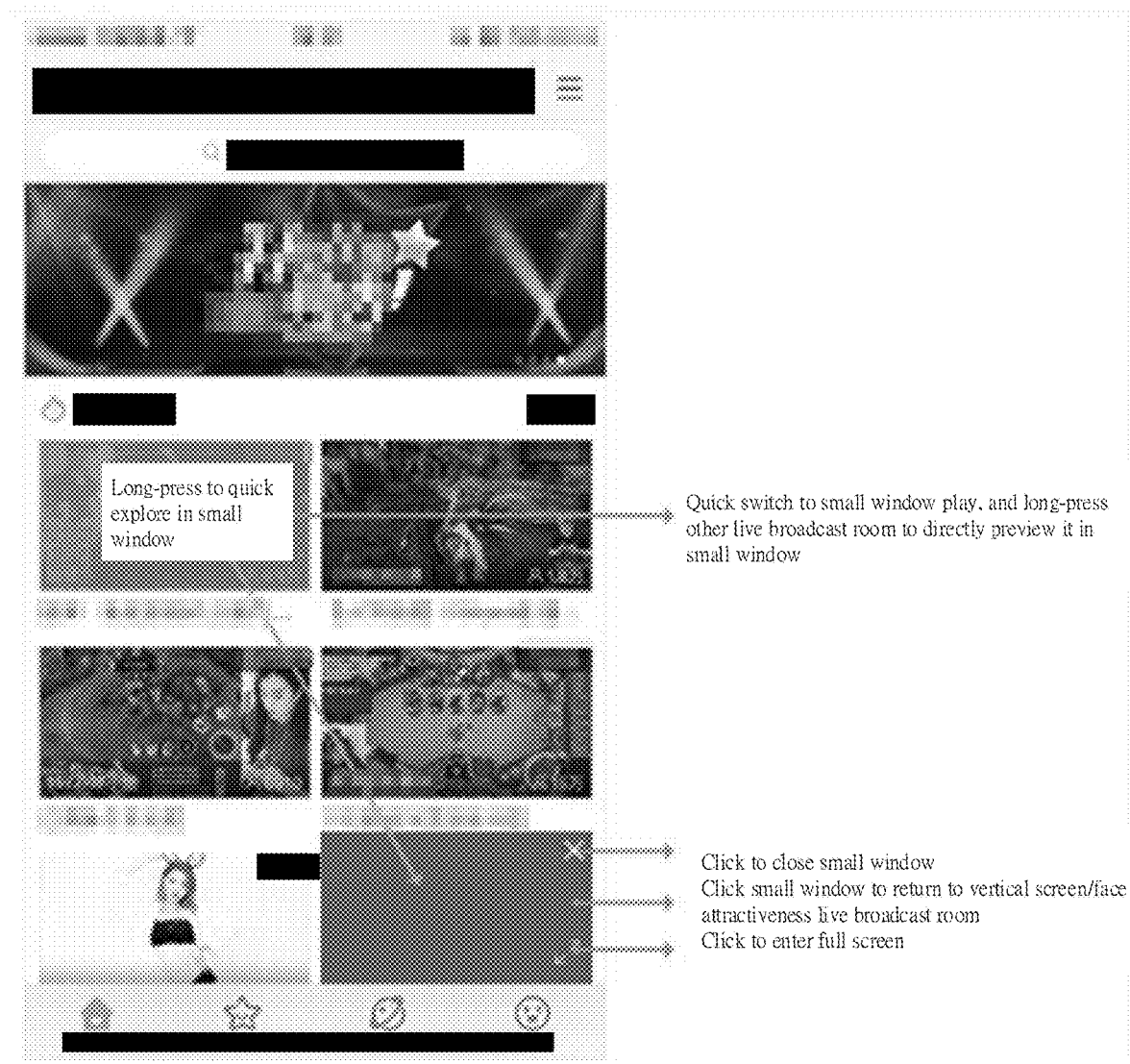
FIG. 16 is a diagram showing the process of clicking a card in another live broadcast room in the small window interface play mode according to an embodiment of the present application.

In one embodiment, as shown in FIG. 16, the terminal directly enters the corresponding live broadcast room from the small window interface and automatically exits the small window interface to add functions. When the small cards in other live broadcast rooms are long-pressed, the small window interface of the current interface is replaced with the content of the live broadcast room corresponding to the clicked small card, and the small window interface playback mode is continued.

In one embodiment, after identifying the first live broadcast card in the live broadcast list is touched by the user on the current interface, it may further include: confirming that the user enters the small window interface play mode for the first time; and prompting the user to close or open the small window interface in the settings.

In one embodiment, using the small window interface to play the audio and video stream of the live broadcast screen of the first live broadcast room or the audio and video stream of the live broadcast screen of the second live broadcast room, the method may further include: loading video stream; and showing the effect of loading video stream. After showing the effect of loading video stream, the method may further include: confirming that the loading failed or detecting a network interruption; prompting the user to refresh; confirming that the user completes the refresh operation, and then reloading the video stream. In a specific embodiment, when the small window interface plays or switches to the live broadcast room, and plays the audio and video streams of the live broadcast screen of the live broadcast room, and when the loaded video stream is not completed, the loading effect is displayed.

In a specific embodiment, when playing in the small window interface, it is switched to other applications (such as pressing the home button or multitasking management switch, instead of exiting the APP). For an Android system: the small window interface playback is shown above all other application interfaces; the movable area is the full screen area, except for the system status bar area; and the other logic and operations used in the small window interface playback are consistent with the application. For IOS: playback is paused, and audio and video are not retained; it is switched to the APP again, and the small window interface continues to play normally.

In a specific embodiment, when the user uses the small window interface to play the audio and video streams of the live broadcast screen in the live broadcast room, the microphone connection between the user and the streamer in the live broadcast room is disconnected. Other users connected to the streamer through the microphone are not displayed in the video screen of the small window interface. When the user shifts from an external application to the live broadcast room (such as from the hand Y to the live broadcast room), he clicks [Back], and the small window interface is not played.

In a specific embodiment, when a user uses a mobile data network to enter a live broadcast room, a mobile network prompt appears. After the user clicks [Back], it returns by default and does not play in the small window interface. Or, when the user is using the small window interface to play the video stream of the live broadcast screen of the live broadcast room, and when a network environment switching is detected, the processing logic of the small window interface reuses the network switching logic in the original live broadcast room. It is only needed to pop up related popups and prompts in the small window interface mode (At the same time, the data flow pop-up window in the original live broadcast room is adjusted to use the system's default pop-up style uniformly).

This application also provides a storage device, including multiple instructions. The instructions are adapted to be loaded by the processor and execute the following steps of the method for switching and displaying live broadcast screen content on a mobile device: displaying multiple live broadcast cards on a current interface; identifying a user's touch action, and determining an address and playback mode of an audio and video stream of a touched live broadcast card according to the touch action; when it is determined that the playback mode is a small window mode, acquiring an audio and video stream of a live broadcast screen of a live broadcast room corresponding to the live broadcast card according to the address of the audio and video stream and parsing the audio and video stream; and drawing a small window interface on the current interface, and using the small window interface to play the parsed audio and video stream of the live broadcast screen; and execute the following steps of the method for switching and displaying live broadcast screen content on a mobile device: displaying multiple live broadcast cards on a current interface to identify a user's touch action on a first live broadcast card in the current interface; acquiring an audio and video stream of a live broadcast screen of a first live broadcast room corresponding to the first live broadcast card; drawing a small window interface on the current interface, and using the small window interface to play the audio and video stream of the live broadcast screen of the first live broadcast room; identifying the user's touch action on a second live broadcast card in the current interface; acquiring an audio and video stream of a live broadcast screen of a second live broadcast room corresponding to the second live broadcast card; and interrupting the playback of the audio and video stream of the live broadcast screen of the first live broadcast room in the small window interface, extracting the audio and video stream of the live broadcast screen of the second live broadcast room, and using the small window interface to play the audio and video stream of the live broadcast screen of the second live broadcast room.

Further, the storage device may be a U disk, a mobile hard disk, a read-only memory (ROM, Read-Only Memory), a RAM, a magnetic disk, or an optical disk and other media that can store program codes.

In other embodiments, the instructions in the storage device provided by the present application are loaded by the processor and execute the steps of the display method for live broadcast screen of live broadcast room on a mobile device and method for switching and displaying live broadcast screen content on a mobile device described in any of the above embodiments.

This application also provides a computer device. The computer device includes: one or more processors; a memory; one or more application programs, wherein the one or more application programs are stored in the memory and configured to be configured by the one or more processors to execute, the one or more application programs are configured to perform the display method for live broadcast screen of live broadcast room on a mobile device and method for switching and displaying live broadcast screen content on a mobile device described in any of the above embodiments.

Figure 17:
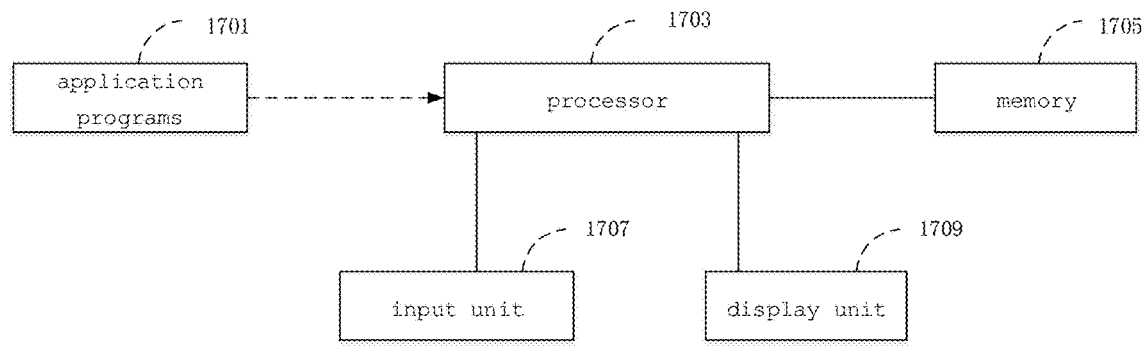
FIG. 17 is a schematic diagram of an embodiment of a partial structure of a computer device provided by this application.

FIG. 17 is a schematic structural diagram of a computer device according to an embodiment of the present application, including servers, personal computers and network equipment. As shown in FIG. 17, the device includes devices such as a processor 1703, a memory 1705, an input unit 1707, and a display unit 1709. Those skilled in the art may understand that the device structure device shown in FIG. 17 does not constitute a limitation on all devices, and may include more or less components than those illustrated, or combine certain components. The memory 1705 can be used to store application programs 1701 and various functional modules, and the processor 1703 runs the application programs 1701 stored in the memory 1705 to execute various functional applications and data processing of the device. The memory may be internal memory or external memory, or include both internal memory and external memory. The internal memory may include read-only memory (ROM), programmable ROM (PROM), electrically programmable ROM (EPROM), electrically erasable programmable ROM (EEPROM), flash memory, or random access memory. The external memory may include hard disks, floppy disks, ZIP disks, U disks, magnetic tapes, etc. The memories disclosed in this application include but are not limited to these types of memories. The memory disclosed in this application is only an example and not a limitation.

The input unit 1707 is used to receive an input of a signal and a keyword input by a user. The input unit 1707 may include a touch panel and other input devices. The touch panel can collect the user's touch operations on or near it (such as the user's operation on or near the touch panel using any suitable objects or accessories such as fingers, stylus, etc.), and drives the corresponding connection devices according to the preset program. Other input devices may include but are not limited to one or more of a physical keyboard, function keys (such as playback control keys, switch keys, etc.), trackball, mouse, joystick, etc. The display unit 1709 can be used to display information input by the user or information provided to the user and various menus of the computer device. The display unit 1709 may take the form of a liquid crystal display, an organic light emitting diode, or the like. The processor 1703 is the control center of the computer equipment. It uses various interfaces and lines to connect the various parts of the entire computer. It runs or executes the software programs and/or modules stored in the memory 1703, and calls the data stored in the memory to execute various functions and processing data.

In one embodiment, the device includes one or more processors 1703, and one or more memories 1705, and one or more applications 1701. The one or more application programs 1701 are stored in the memory 1705 and are configured to be executed by the one or more processors 1703, and the one or more application programs 1701 are configured to perform the display method for live broadcast screen of live broadcast room on a mobile device and method for switching and displaying live broadcast screen content on a mobile device described in above embodiments.

In addition, each functional unit in each embodiment of the present application may be integrated into one processing module, or each unit may exist alone physically, or two or more units are integrated into one module.

The above integrated modules can be implemented in the form of hardware or software function modules. If the integrated module is implemented in the form of a software functional module and sold or used as an independent product, it may also be stored in a computer-readable storage medium.

Those of ordinary skill in the art may understand that all or part of the steps to implement the above-described embodiments may be completed by hardware, or may be completed by a program instructing related hardware. The program may be stored in a computer-readable storage medium, and the storage medium may include Memory, magnetic disk or optical disk, etc.

The above is only part of the implementation of this application. It should be pointed out that for those of ordinary skill in the art, without departing from the principles of this application, a number of improvements and retouches can also be made. These improvements and retouches should also be regarded as the scope of protection of this application.

The invention claimed is:

1. A display method for live broadcast screen of live broadcast room on a mobile device, comprising the following steps:
    displaying multiple live broadcast cards on a current interface;
    identifying a user's touch action, and determining an address and playback mode of an audio and video stream of a touched live broadcast card according to the touch action;
    when it is determined that the playback mode is a small window mode, acquiring an audio and video stream of a live broadcast screen of a live broadcast room corresponding to the live broadcast card according to the address of the audio and video stream and parsing the audio and video stream; and
    drawing a small window interface on the current interface, and using the small window interface to play the parsed audio and video stream of the live broadcast screen, wherein further comprising, before drawing a small window interface on the current interface,
    determining the shape attribute of the live broadcast screen corresponding to the touched card according to the touch action; and
    drawing of the small window interface on the current interface includes: drawing the small window interface according to the shape attribute of the live broadcast screen.

2. The method as recited in claim 1, wherein the shape attributes of the live broadcast screen include a half-screen shape and a vertical screen shape; determining the shape attribute of the live broadcast screen of the live broadcast room corresponding to the touched card according to the touch action, and drawing the small window interface according to the shape attribute of the live broadcast screen, includes:
    if it is determined that the shape attribute of the live broadcast screen corresponding to the touched card is a half-screen shape, drawing a half-screen small window interface according to the half-screen live broadcast screen; and
    if it is determined that the shape attribute of the live broadcast screen corresponding to the touched card is a vertical screen shape, a vertical window-shaped small window interface is drawn according to the vertical screen shaped live screen.

3. A method for switching and displaying live broadcast screen content on mobile device, comprising the following steps:
    displaying multiple live broadcast cards on a current interface to identify a user's touch action on a first live broadcast card in the current interface;
    acquiring an audio and video stream of a live broadcast screen of a first live broadcast room corresponding to the first live broadcast card;
    drawing a small window interface on the current interface, and using the small window interface to play the audio and video stream of the live broadcast screen of the first live broadcast room;
    identifying the user's touch action on a second live broadcast card in the current interface; acquiring an audio and video stream of a live broadcast screen of a second live broadcast room corresponding to the second live broadcast card; and
    interrupting the playback of the audio and video stream of the live broadcast screen of the first live broadcast room in the small window interface, extracting the audio and video stream of the live broadcast screen of the second live broadcast room, and using the small window interface to play the audio and video stream of the live broadcast screen of the second live broadcast room; wherein
    further comprising, before using the small window interface to play the audio and video stream of the live broadcast screen of the first live broadcast room or before using the small window interface to play the audio and video stream of the live broadcast screen of the second live broadcast room:
    obtaining the shape attribute of the live broadcast screen of the live broadcast room corresponding to the audio and video stream played by the small window interface;
    using the small window interface to play the audio and video stream of the live broadcast screen of the first live broadcast room, or using the small window interface to play the audio and video stream of the live broadcast screen of the second live broadcast room, comprises: adjusting the small window interface according to the shape attribute of the live broadcast screen of the live broadcast room, and using the adjusted small window interface to play the audio and video stream of the live broadcast screen of the live broadcast room.

4. A computer device, comprising:
one or more processors;
a memory;
one or more application programs, wherein the one or more application programs are stored in the memory and configured to be configured by the one or more processors to execute, the one or more application programs are configured to perform the display method for live broadcast screen of live broadcast room on a mobile device according claim 1.

5. A computer device, comprising:
one or more processors;
a memory;
one or more application programs, wherein the one or more application programs are stored in the memory and configured to be configured by the one or more processors to execute, the one or more application programs are configured to perform the method for switching and displaying live broadcast screen content on a mobile device according claim 3.

* * * * *